United States Patent [19]
Ryan

[11] Patent Number: 5,313,201
[45] Date of Patent: May 17, 1994

[54] VEHICULAR DISPLAY SYSTEM
[75] Inventor: Timothy D. Ryan, Darnestown, Md.
[73] Assignee: Logistics Development Corporation, Darnestown, Md.
[21] Appl. No.: 575,605
[22] Filed: Aug. 31, 1990
[51] Int. Cl.$^5$ .............................................. G08G 5/04
[52] U.S. Cl. ..................... 340/961; 342/29; 342/41; 364/461
[58] Field of Search ........... 340/961, 971, 945; 364/439, 461; 342/29, 30, 32, 36, 37, 38, 41, 458

[56] References Cited

U.S. PATENT DOCUMENTS

| | | |
|---|---|---|
| 2,486,197 | 10/1949 | Newbold . |
| 2,995,739 | 8/1961 | Mannheimer . |
| 3,114,908 | 12/1963 | Hall . |
| 3,300,778 | 1/1967 | Vickers ................................. 342/30 |
| 3,697,987 | 10/1972 | Arthur . |
| 3,725,918 | 4/1973 | Fleischer et al. . |
| 3,849,782 | 11/1974 | Bond ..................................... 342/30 |
| 4,403,220 | 9/1983 | Donovan .............................. 342/29 |
| 4,466,068 | 8/1984 | Degre et al. ......................... 364/461 |
| 4,623,966 | 11/1986 | O'Sullivan .......................... 364/461 |
| 4,714,929 | 12/1987 | Davidson ............................. 340/979 |
| 4,835,537 | 5/1989 | Manion ................................. 342/30 |
| 4,841,292 | 6/1989 | Zeno .................................... 340/736 |
| 4,914,733 | 4/1990 | Gralnick ............................... 340/961 |

FOREIGN PATENT DOCUMENTS 3210694A 10/1983 Fed. Rep. of Germany .

OTHER PUBLICATIONS

Human Factors, 1987, 29(4), 371-382 "Perspective Traffic Display Format and Airline Pilot Traffic Avoidance", Ellis et al.

Human Factors, 1988, 30(2), 163-169 "Operator Performance as a Function of type of Display: Conventional versus Perspective", Bemis et al.

"Inside the Black Box", IEEE Spectrum, Nov. 1986, p. 65.

Primary Examiner—Brent Swarthout
Attorney, Agent, or Firm—Bacon & Thomas

[57] ABSTRACT

A vehicular display includes a three-dimensional representation of a moving host vehicle fixed at a stationary point on the screen, and dynamic representations of objects located within a predetermined distance of the host vehicle in locations proportional and scaled to their respective distances and locations from the host. The display plots the trajectories of these objects and classifies them according to probability of collision, warning the user if collision is imminent. The display also includes a variety of navigational aids, including heading lines, compass indications, and various non-alphanumeric indicators. Both the hardware and software used in the system are of the type which may be provided on small civilian craft, in addition to replacing the more complex and less intuitive displays presently provided in such contexts as commercial aircraft, marine vehicles, and air traffic control systems. The display also may be adapted for use in outer space.

34 Claims, 20 Drawing Sheets

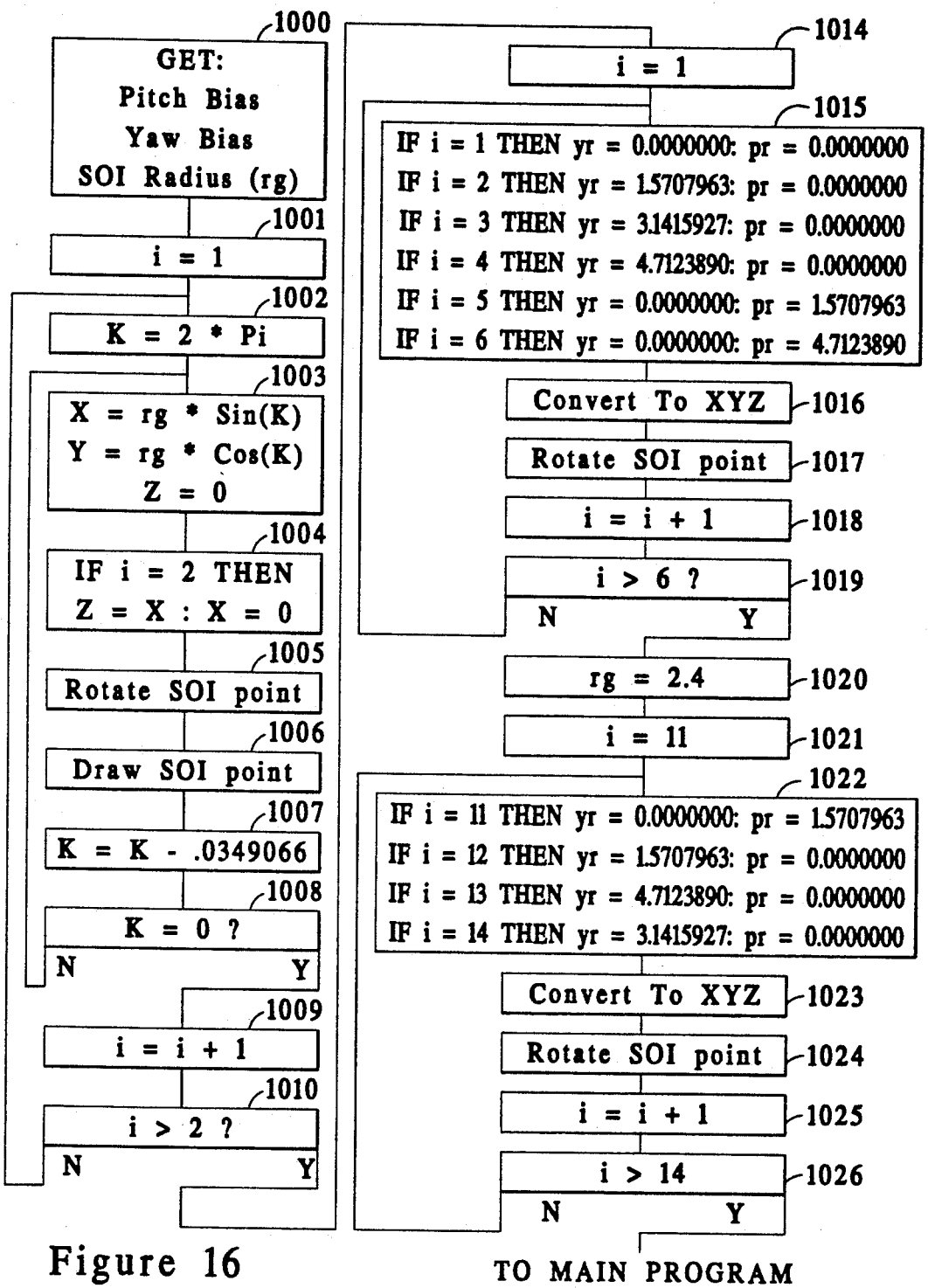
Figure 16 TO MAIN PROGRAM

VEHICULAR DISPLAY SYSTEM

BACKGROUND OF THE INVENTION

1. Field of the Invention

This invention relates to a vehicular display system, and more particularly to a display system in which objects external to a host vehicle are dynamically displayed in a representation of three dimensional spherical space on a two dimensional screen in locations proportional, and scaled, to their respective distances and locations from the host vehicle. The display system of the invention is especially suitable for use in an aircraft collision avoidance system, but also has numerous other potential uses in the fields of navigation, education, and entertainment, and in vehicular contexts ranging from automobiles to submarines to space craft.

2. Description of Related Art

At present, no commercially available or Federal Aviation Administration approved aircraft collision avoidance system (CAS) exists for the hundreds of thousands of small private aircraft in use in the United States, and millions of like aircraft throughout the rest of the world. Existing CAS's used in much larger airframes are limited in their efficacy because they are too expensive, too large, and too heavy for small civilian aircraft, and because they present the display data in a two dimensional format which requires extensive training and experience to master.

A main problem with existing vehicular collision and navigational display systems is that they incorporate too much alphanumeric data for the average user to interpret in the time available. The average user tends to become confused when too much alphanumeric data is presented to him or her for interpretation in too short a time.

A prime example of this problem is in the display conventionally used by air traffic controllers, a flat and two-dimensional display which presents multiple flight-paths for various aircraft to the controller in such a way that the controller is left with the responsibility of digesting information on each flight path, and converting the information mentally into a three dimensional picture that controllers have to hold in their heads and update in real-time while at the same time holding verbal conversations with overstressed pilots.

In order to avoid this problem, not only in the air traffic context, but also in the context of vehicular collision and navigational display systems in general, and also in numerous other fields in which the problem of presenting multi-dimensional information on a two-dimensional screen is present, it would be desirable to provide a display in which alphanumeric data is not required and yet the same information will be immediately conveyed to the user without the need for sophisticated interpretation. Such a display would enable the user to utilize the data in a more effective, efficient, and natural way, alleviating stress and enhancing user responses to emergency situations. It would also permit use by users of all nationalities, including those which use character based writing systems.

SUMMARY OF THE INVENTION

It is an objective of the invention to provide an ultimately user-friendly vehicular display system which presents collision threat data in a totally natural way, without the use of alphanumeric information, and which users of any of the types of vehicles identified elsewhere in this document will be able to master as soon as they see the display in operation.

It is a further object of the invention to provide a vehicular display system in which the host vehicle or craft is fixed at the origin of a stationary coordinate system, and all other objects within a predetermined distance from the host craft are displayed as moving in the stationary coordinate system of the host craft.

It is a further objective of the invention to provide the pilot or navigator of a vehicle in which the pilot or navigator normally has a limited field of view, for example, an aircraft or a ship, with a display system in which the host vehicle or craft is fixed at the origin of a stationary coordinate system, but which nevertheless allows the user to envision his craft as if the user were "outside" the craft inspecting it, and its surroundings, from any desired point in three-dimensional spherical-space.

It is a still further objective of the invention to provide a display which is designed so that it may be implemented using an off-the-shelf personal-computer processor, or similar computing circuitry of the type which is readily available and affordable by any potential user of the system, and which thus is suitable for use in small civilian light aircraft and ships.

It is yet another objective of the invention to provide an instantly recognizable indicator of the orientation and direction of the host craft and an object moving in relation to the host craft user, while using the minimum number of lines and nodes possible to have a three-dimensional shape, by indicating the host craft and objects other than the host craft in the display by a "windtee", a tetrahedron shaped symbol similar to the wind socks which are used at airports to indicate to pilots the direction of the wind.

It is another objective of the invention to provide a vehicular display system which enables the user to instantly distinguish between imminent collision threats, probable collision threats, and potential collision threats.

It is another objective of the invention to provide a vehicular display system in which instantly recognizable, non-alphanumeric indicators of location in respect to the earth's surface or other geographic or astronomic reference points are displayed, in addition to and at the same time as, the collision threat indicators.

These objectives are achieved by providing a display in which speed and location coordinates are input for the host craft and each object of interest within a predetermined space, and wherein the input speed and location coordinates are transformed into coordinates of a stationary three-dimensional coordinate system whose origin is defined as the position of the host craft.

BRIEF DESCRIPTION OF THE DRAWINGS

FIG. 16 is a flowchart of the sphere of influence generation routine shown in FIGS. 15A-15E.

DETAILED DESCRIPTION OF THE PREFERRED EMBODIMENTS

This description is organized into three sections. The first section sets forth a unique system for displaying a vehicle and its surroundings in real time. The second section describes two hardware embodiments for implementing the system. The third section describes a method of implementing the system using the hardware described in the second section.

I. System Concepts (i) The Windtee

Figure 1:
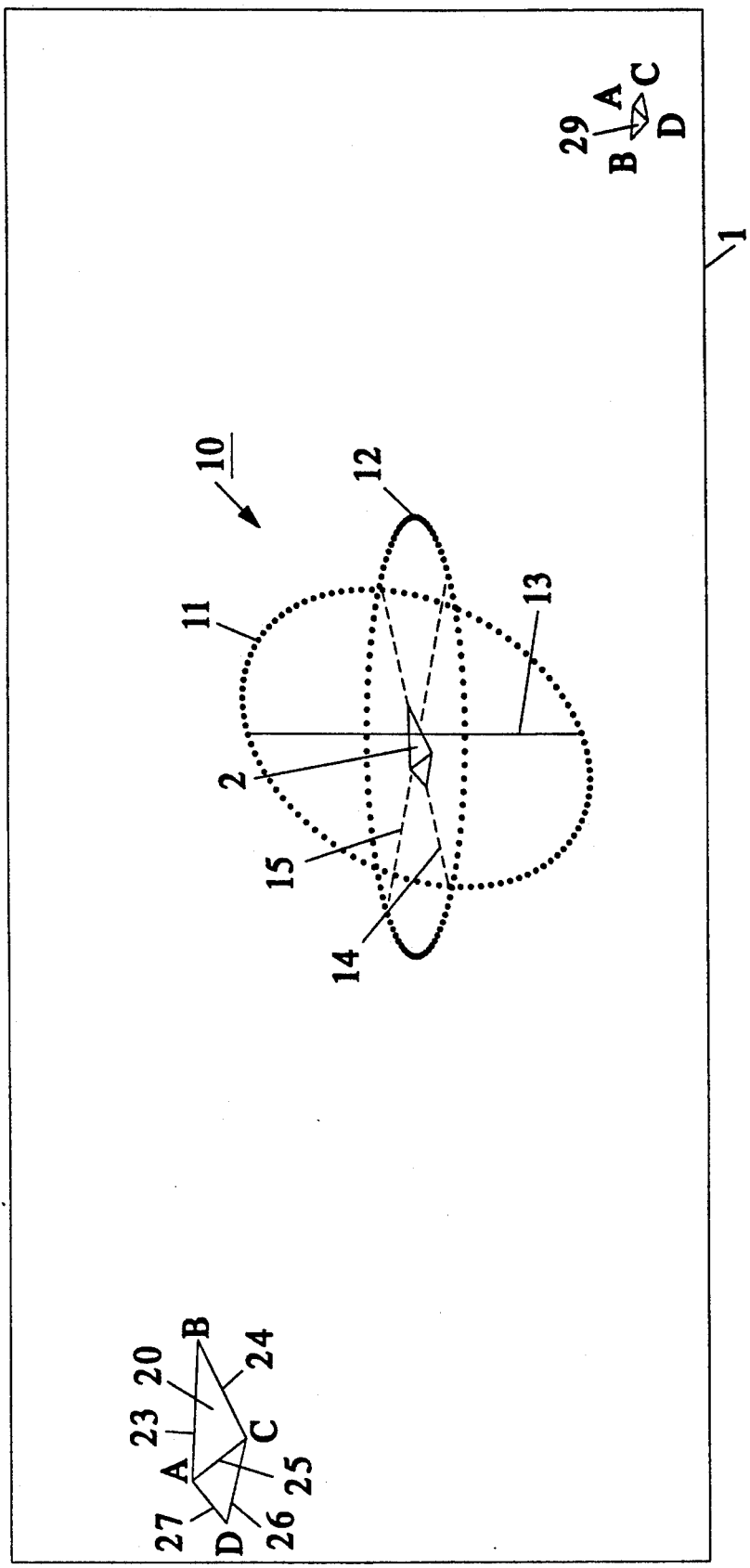
FIG. 1 shows a display generated according to the principles of a preferred embodiment of the invention, including a host craft and two potential collision threats.
Figure 2:
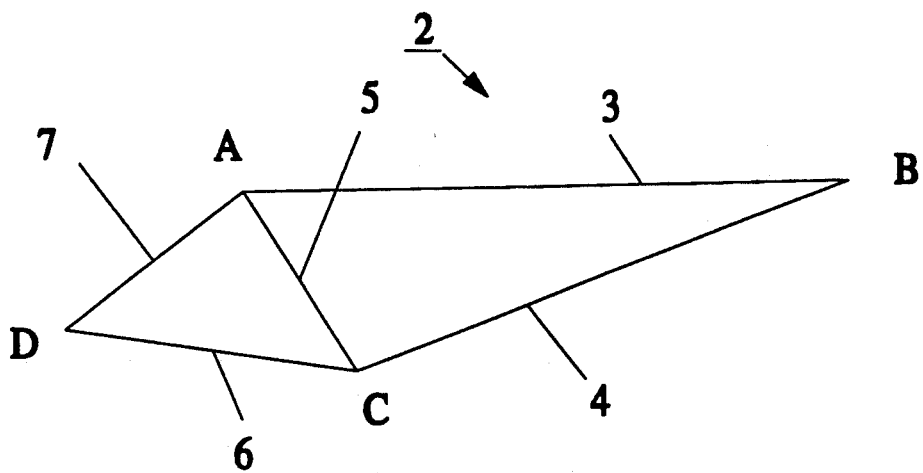
FIG. 2 shows a "windtee" symbol which represents both the host craft and other objects in the display of FIG. 1.

FIG. 1 is a representation of a display screen 1 generated according to the principles of a preferred embodiment of the invention. The display was generated on an IBM PC-XT TM personal computer using a flat video screen and an Enhanced Graphics Adapter (EGA) card, and features a "host craft" 2 in the form of a windtee generated using five lines, 3-7 connecting four points A-D on the screen as shown in FIG. 2.

The host craft 2 is the vehicle whose surroundings are being displayed, which may for example be the vehicle in which the user is situated. The direction in which the windtee points is the direction in which the host craft is traveling, and is generally fixed at a predetermined "pitch" and "yaw" as will be described below.

The windtee symbol, a tetrahedron similar in function to the wind socks used to indicate wind direction at small airports, provides an immediate and intuitive indication of the direction of the host craft, yet is completely defined by the four points or vertices A-D and at most six connecting lines. Thus, the windtee may be generated and manipulated in real time even on the relatively unsophisticated XT TM class computer on which the drawing Figures were generated. Also, the windtee design offers the advantage of being generally transparent so as not to obscure other displayed objects in the line of sight of a user of the system, although it may nevertheless in some cases be desirable to make the windtee "diaphanous," for better visibility without obscuring objects in the line of sight.

It will of course be appreciated that the choice of computer, video monitor or display screen, and graphics hardware or software may be varied according to requirements of cost and context. A more powerful computer or graphics board will produce a more detailed display, with more options. It is intended that all such variations be included within the scope of the invention.

It should also be appreciated that the static drawing Figures do not do justice to the inventive display which is intended to be dynamic, with only the host craft fixed and all other objects displayed as moving relative to the host craft.

(ii) Out of Body Point of View

In order to enable the user to visualize the position of his vehicle or "host craft" in a more natural manner than is possible with conventional radar or sonar displays, the preferred display uses an "out of body" point of view. Essentially, the "out of body" concept enables the user to see not only the objects surrounding the host craft, but also the host craft itself, while at the same time displaying the objects in the way in which the user intuitively perceives the world, i.e., with the host craft at the center of a fixed three dimensional universe in which all objects are moving relative to the host craft.

In FIG. 1, host-craft 2 is displayed at the center of the screen in such a way that the host craft appears to have a pitch angle of 0.3 radians and a yaw angle of 0.7 radians in respect to the actual plane of the display screen. Although this orientation of the host craft and its coordinate system for display purposes is preferred because it appears to provide the best perspective by which the user can recognize the direction and relationship of objects in the display which are external to the host craft, the orientation may be varied as desired.

Unlike displays in which the host craft is not fixed within the display, the inventive display utilizes the psychological principle that humans tend to most easily envision objects in terms of distances from themselves. At the same time, however, in applications where the user is actually situated within the host craft, the inventive display provides an out-of-body experience whose advantages were eloquently suggested by Robert Burns in a 1786 poem: "Oh wad some power the giftie gie us, To see oursels as others see us! It wad frae monie a blunder free us, . . . ." In other words, the pilot or navigator of a vehicle can look at the vehicle and its surroundings from an omniscient point of view outside of the vehicle, while at the same time viewing the surroundings as moving relative to the vehicle.

Figure 26:
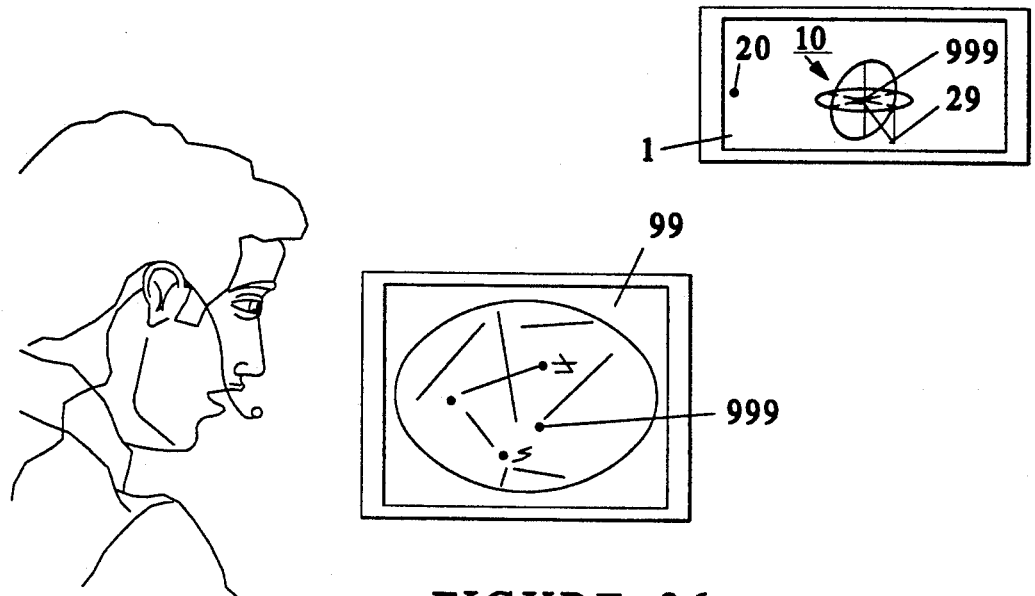
FIG. 26 is an illustration of a preferred embodiment of the invention for use by an air traffic controller.

It will of course be appreciated that the user may not necessarily be situated in the "host craft". For example, the display could be used by an air traffic controller who would dial-up any host craft system on a radio link, as will be explained below, and look at the space, water, or atmosphere surrounding the host craft from the perspective of the host craft. The possibility is illustrated in FIG. 26, which shows the inventive display screen 1 as it might be used in combination with a conventional air traffic control display 99. The controller has selected a single one of the numerous radar blips 999 on display 99 for viewing as the host craft in display 1, and can easily determine that two objects 20 and 29 are within a predetermined distance from the host craft, and also easily determine their trajectories and collision probability.

(iii) Sphere of Influence

Also shown in FIG. 1 is a "sphere of influence" 10, indicated by circles 11 and 12. The sphere of influence permits the user to judge the size and distance of other objects in the display by comparing it to a known quantity. Circles 10 and 11 resemble a "gyroscope" with vertical axis 13, horizontal axis 14 which extends in the direction of movement of the host craft, and horizontal axis 15 transverse to the axis of movement. Axes 13-15 are mutually perpendicular and therefore form a Cartesian or "X, Y, Z" coordinate system, wherein axis 13 is the Z axis, axis 14 is the X axis, and axis 15 is the Y axis.

The preferred "sphere of influence" representation shown in FIG. 1, using two circles, is suitable for use with an enhanced graphics adapter (EGA) display, but it is also within the scope of the invention to use a more powerful display and create a continuous diaphanous "bubble" display which completely encloses the host craft. Such a "bubble" display would provide a more intuitive "sphere of influence" than does the "gyroscope" depicted in FIG. 1.

The scale represented by the "sphere of influence" may be varied depending on context. For example, in an aircraft application, it may be desirable to set the radius of the sphere of influence to represent five miles in order to indicate the airspace normally assigned to all aircraft under normal flying conditions. On the other hand, in a submarine, travelling under a polar ice floe, the sphere of influence might be set to represent a distance of less than 100 feet. In addition, it will be appreciated that the shape of the sphere of influence need not be spherical. A submariner in an elongated craft, for example, may prefer the envelope to follow the shape of the craft itself, for example by using ellipses instead of circles in the gyroscope.

(iv) Collision Threats

Also shown in FIG. 1 are two objects 20 and 29, which are intended to be displayed in real time as moving in relation to the host craft. Depending on the context in which the display is used, objects 20 and 29 may represent such other vehicles or objects as missiles, mines, portions of the terrain, reefs, dirigible balloons, meteorites, and so forth.

Objects 20 and 29 are represented by windtees formed by four points A-D of the same type as is used to represent the host craft, the apex B of the windtees being pointed in the direction in which the object is traveling relative to the host craft. Object 20, represented by lines 23-27, will be recognized as approaching the host craft from above and to the rear while object 29 is seen to be crossing below the host craft's path. Because all objects shown on the screen are within a predetermined distance from the host craft and could possibly change trajectories to intercept the host craft, they will hereinafter be referred to as collision threats.

(v) Scaling

In order to indicate the position of the objects along an axis perpendicular to the plane of the screen, i.e., in a depth direction, the objects are scaled. Use of scaling gives a perception of depth to the display and allows the user to intuitively determine whether or not a displayed object is closer or further away than the host craft, when viewed from the perspective of the user.

Consequently, the size of the object's windtee must be used solely to indicate relative distance from the host craft, and not be representative of the physical size of the object. In FIG. 1, collision threat 20 is shown as being larger than the host craft and is therefore perceived as being closer than the host craft to the user's vantage point outside the screen. Similarly, collision threat 29 is depicted as smaller than the host craft, and therefore can be immediately recognized as being further away from the user's vantage point than is the host craft.

It should be again noted that the display is intended to be dynamic, the objects moving in real time in relation to the fixed host craft, and that when represented dynamically, the illusion of depth is more apparent than it is in a still representation such as FIG. 1.

(vi) Point In Space Indicator Triangulation Symbols

Figure 3:
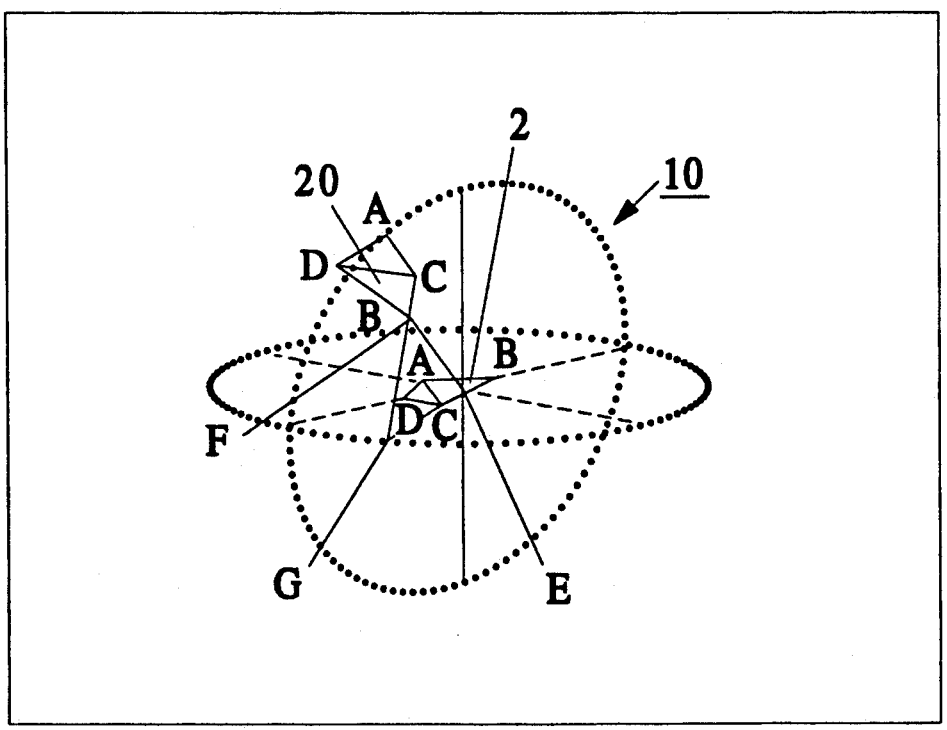
FIG. 3 shows a display generated according to the principles of the preferred embodiment of FIG. 1, and further including an imminent collision threat triangle indicator.

In the special case of a collision avoidance system, it is desirable in certain circumstances to give a more precise indicator of the relationship between the incoming target and the host craft. For this purpose, a coordinate triangle indicator is provided, as shown in FIG. 3. The triangle with vertices E, F, and G replaces the conventional alphanumeric coordinate indicators provided in conventional systems. Vertex E is located at the host craft 2, vertex F is at collision threat 29, which is travelling on a path which appears to intercept that of the host craft, and vertex G is located in the horizontal XY plane of the host craft to form light triangle EFG.

In extreme emergency situations, it is essential that the user of the system be able to visually judge the location, direction, and speed of the oncoming vehicle, making a logical set of assumptions and, where possible, taking evasive action to counter or avoid the onrushing threat. The triangle indicator enables the user to avoid the threat, without the need for the user to process alphanumeric information, by permitting the user to judge the altitude and actual distance of the threat from the host craft. As with the scaling feature, it will be appreciated that the triangle indicator is much more effective when presented dynamically as intended.

The triangle indicators may be drawn at very high speed because they are defined by only three points in space, one of which, point E, is at the center of the screen, the second coordinate, point G, being the projection of the position onto the XY plane, and the third, point F, being the actual position of the threat. As a result, a "real time" display may be achieved with relatively inexpensive computing equipment.

The point in space indicator triangulation symbols can be further used to distinguish the collision probability based on the trajectory of the collision threat. Objects within the space defined by the screen are classified according to the imminence of the threat, and different visual and, optionally, audible indicators are used to distinguish the different classifications.

A first type of triangulation symbol is used to indicate imminent and near imminent collision threats. In this situation as shown in FIG. 3, an object has moved into the space reserved around the host craft and the heading of the threat is such that a collision is likely. The display informs the user that a collision is imminent, from which direction the threat target is coming, its relative height in respect to the directional plane of the host craft, and the threat's relative speed. All of these indications are purely visual, and natural to the host craft's user.

In FIG. 3, the threat 20 shown within the sphere of influence at point F is on a collision course from the starboard rear at about 5 o'clock. The triangulation symbol is formed by lines EF, FG and GE. In the display, each of these lines is drawn in a manner which will unambiguously and immediately draw the attention of the user to the dire situation. In the preferred embodiment, the lines are drawn in bright, solid, flashing red, and an audible warning may also be provided.

In addition to the warning provided by highlighting the symbol with bright colors and flashing or similar attention-getting indicators, other indications may be provided on the screen, such as a change in color of the background, or an additional symbolic warning on the screen at a location which will not obscure the information conveyed by the triangulation symbol and sphere of influence around the host craft.

Figure 4:
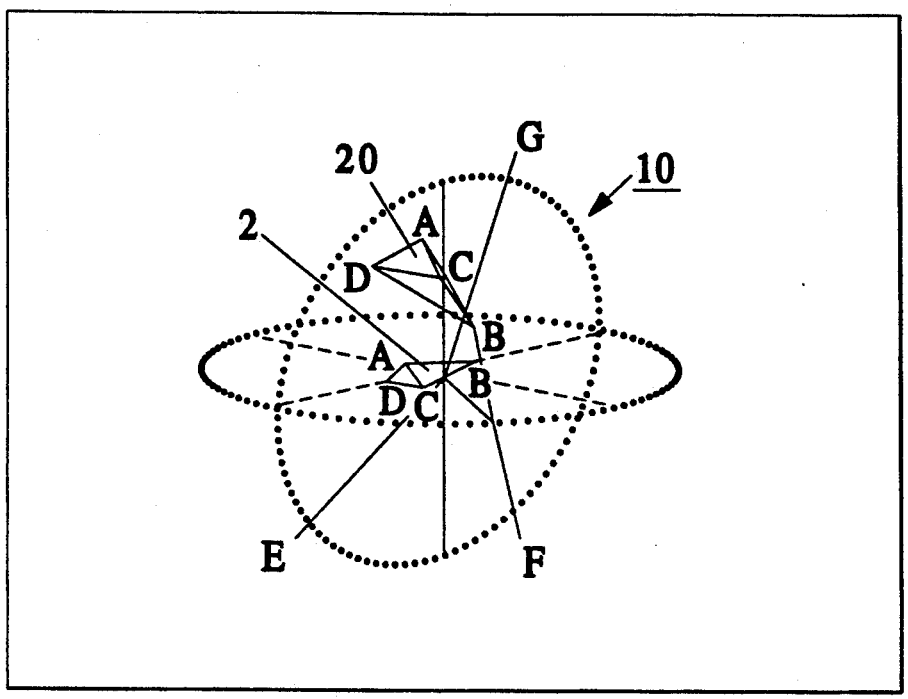
FIG. 4 shows a variant of the triangle indicator of FIG. 3, indicating a probable collision threat.

A second situation is when the collision threat has moved into the space reserved around the host craft, but the heading of the threat is such that an imminent collision is possible, but not probable, as illustrated in FIG. 4. The display informs the user that a possible imminent collision situation exists, the direction from which the target is coming, its relative height, and its relative speed. All of these indicators are again purely visual, and natural to the host craft user.

Point E of the triangle indicator is again at the center of the universe, i.e., the location of the host craft. Point F is always drawn on the rim of the sphere of influence in the same plane as the host craft, thus acting as a "compass pointer" for the host craft user. Point G is again placed on the screen in a location that represents the position of the collision threat in three-dimensional spherically coordinated space. To distinguish this situation from the imminent collision situation, line EF is preferably drawn in bright, solid, flashing red, while lines FG and GE are drawn in normal level, solid, non-flashing red. In addition, a less cacophonous audible warning than is used for the imminent collision situation may be provided.

Figure 5:
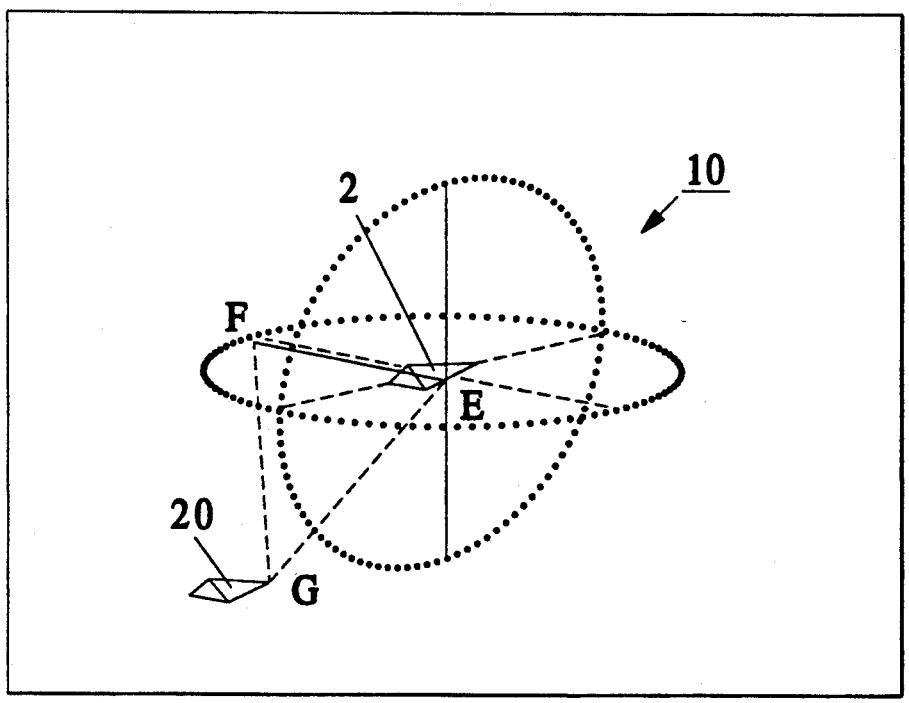
FIG. 5 shows a variant of the triangular position indicator of FIG. 3, indicating a potential collision threat.

The final situation distinguished by the display of the preferred embodiment is a situation wherein an object is overtaking the host craft, but has not moved into the space reserved around the host craft, as shown in FIG. 5, and is thus not an imminent or near imminent threat. The visual and audible indications are such that the host craft user is made aware of the presence of the threat in case the threat were to suddenly change course or in case the host craft user were to wish to change the course of the host craft, but the indication is sufficiently different from the imminent collision situation so as not to elicit undue panic.

Again the triangle indicator is used, but the lines of the triangle are drawn in solid, non-flashing green, for example. Further, the brightness of the triangle may be made variable, increasing when the threat is nearest to the host craft and gradually fading to a non-visual state as the target moves away. This situation is shown in FIG. 5. The dotted lines of the triangle would be represented in the preferred embodiment by solid non-flashing green lights, although it is also possible for the triangle to use non-solid lines exactly as shown.

(vii) Clock Symbols

Figure 6:
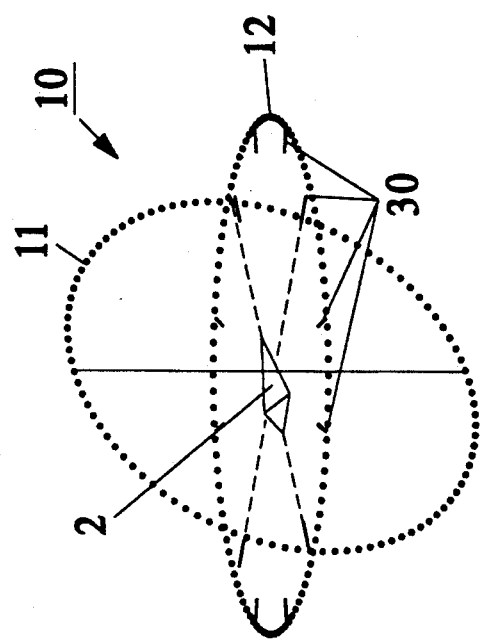
FIG. 6 shows a variant of the host craft sphere of influence indicator shown in FIG. 1, including clock base inscriptions.

The equatorial (xy) plane of the sphere of interest may optionally be inscribed at positions equivalent to the hour points on a clock face as shown in FIG. 6. This feature permits the user to quickly describe the position of a collision threat to another user in the host craft, for example to a copilot, or to a third party user such as a control tower in the internationally recognized shorthand for aircraft positions, with twelve o'clock as the heading of the host craft, and six o'clock at the rear. In this way, the user may describe the threat target's location, for example, as "two o'clock high", referring to a threat located at a position corresponding to the two o'clock inscription point and above the equatorial plane.

(viii) The Pendulum

Many collisions involving vehicles occur not between one vehicle and another, but between a vehicle and the ground or some obstacle attached thereto. Therefore, the collision avoidance system of the preferred embodiment includes the ability to display the orientation of the host craft in respect to the earth or to vertical, and also the distance between the earth and the host craft, in a non-alphanumeric manner. This feature is illustrated in FIGS. 7A–7E, which show the host craft 2 surrounded by its sphere of influence "gyroscope" circles 11, 12. Extending below the host craft a first line 31 parallel to axis 13, and a second line 32 and circle 33 which together form a "plumb line" or "pendulum" 34. Line 31 indicates the projection in Cartesian three-dimensional space of the position of the pendulum in respect to the x-axis, the angle between lines 31 and 32 representing the deviation of the host craft from vertical. The circle 33 may be thought of as a weight which keeps line 32 vertical.

Figure 7A:
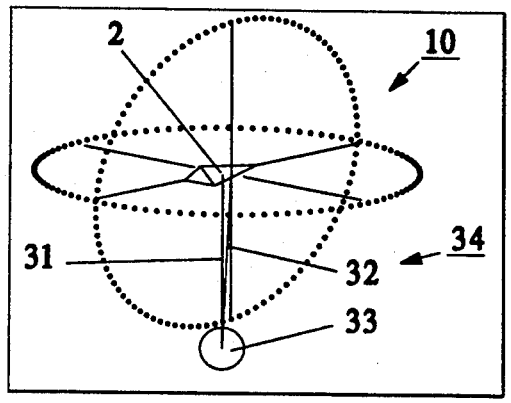
FIG. 7A-7E show the host craft sphere of influence display of FIG. 1, further including a triangle indicator for indicating the orientation of the host craft with respect to the earth.

When the host craft is in flight and neither climbing nor descending, and the earth is not in a position with respect to the host craft which would represent any kind of collision threat, the pendulum line 32 and weight 33 are displayed in a faint, solid, green color and coincide generally with the vertical or y axis of the gyroscope. This situation is shown in FIG. 7A.

Figure 7D:
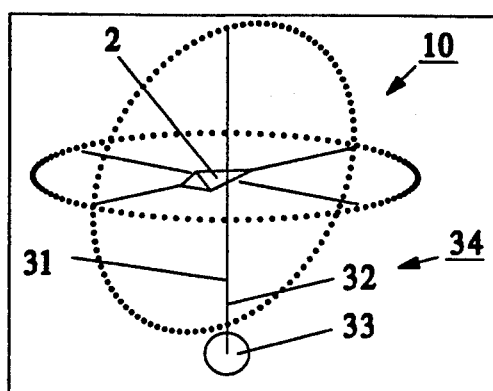
Figure 7B:
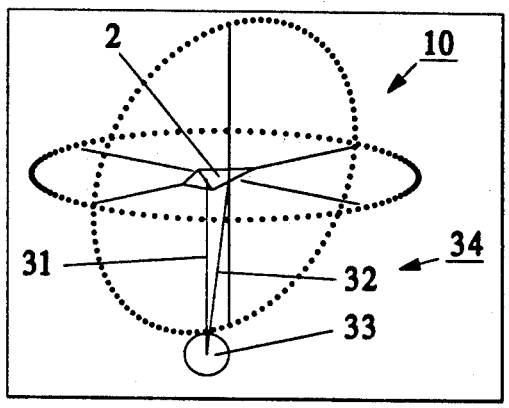
Figure 7E:
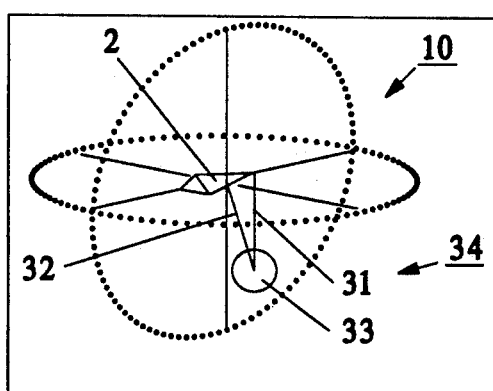
Figure 7C:
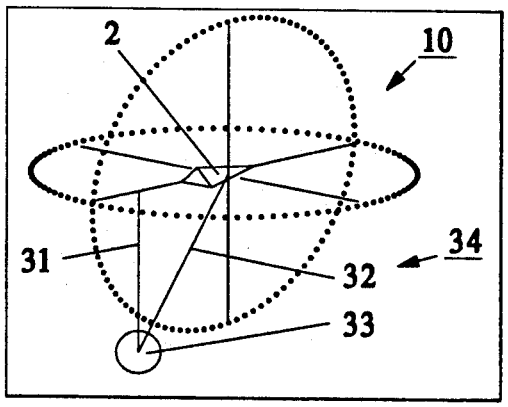

As the host craft begins to climb its orientation on the screen doesn't change, but the pendulum appears to swing down and to the rear, as shown in FIGS. 7B and 7C, the increasing angle between lines 31 and 32 indicating an increasing pitch attitude. Because the earth is receding from the host craft under these conditions, it is not considered to be threat at this time and, therefore, the pendulum line and weight are shown in a faint, solid, green or similar non-threatening color.

As the host craft levels-off, as shown in FIG. 7D, the pendulum appears to swing back underneath the host craft, but does not get closer to it because the host craft has not lost any altitude. As the earth is maintaining its distance from the host craft under these conditions, it is not considered to be a threat at this time, and the pendulum line and weight are still displayed in the non-threatening mode.

Finally, as the host craft dives, the pendulum appears to swing forward and gets closer as the host craft loses altitude as shown in FIG. 7E. As the earth incurs the sphere of influence under these conditions, it is considered to be a collision threat and the pendulum line and weight are shown in a thick, solid, red color.

(ix) Heading Lines

The display system of the invention is, as mentioned above, not limited to collision avoidance applications but also has a wide variety of other applications, including navigation. For this purpose, the preferred display system includes a heading line 40 symbolically attached, at one end, to the destination or a specified heading, and at the other end to the host craft. This feature is shown in FIGS. 8A and 8B.

The heading line 40 shown may be displayed in a non-threatening color, for example green, at all times. If host craft 2 drifts from this heading, a triangle indicator is formed between the host craft's desired heading 40, its actual heading 41, and its present position, as always at the center of the screen. The internal area 42 of this course deviance triangle is preferably shaded in red or a similar warning color, and an audible warning sounded. The brilliance of the warning color shading, and the level of the audible warning, may be controlled to be directly dependent upon the degree of deviation.

Figure 8A:
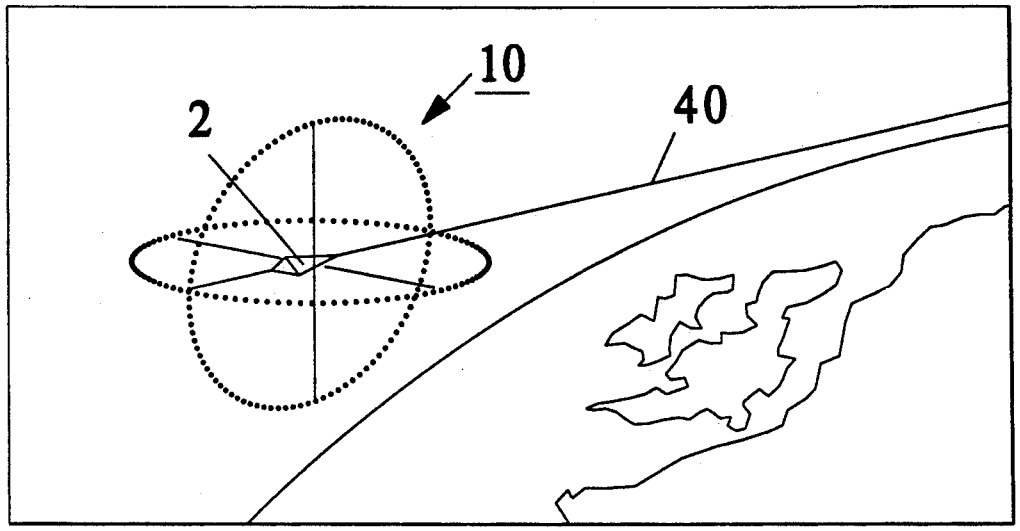
FIGS. 8A and 8B illustrate the host craft sphere of influence display of FIG. 1, further including navigational heading lines.
Figure 8B:
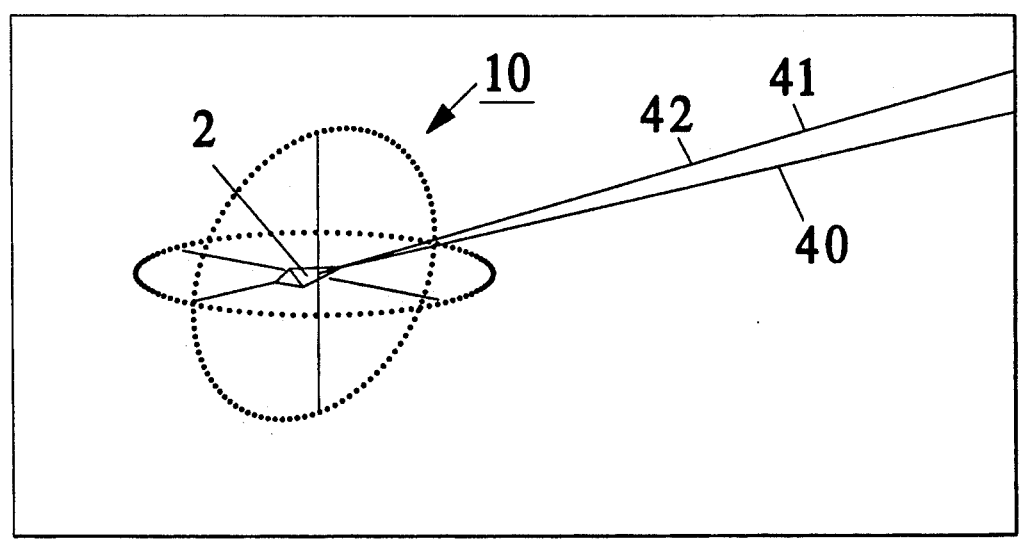

FIG. 8A shows the host craft as being on-course. When the host craft drifts off course, the heading line shifts into an off-course mode, illustrated in FIG. 8B. The heading line leg 40 of the deviance triangle is displayed in the non-collision threat color, while the other visible leg 41 of the deviant triangle and the shading 42 are shown in warning colors.

As the host craft drifts even further off course, the heading line goes into a mode similar to the imminent collision mode. The heading line leg of the deviance triangle is preferably shown in the non-warning color, while the other visible leg of the deviant triangle and the shading are shown in the warning colors. When the pilot corrects the course, all reverts to normalcy.

It will be noted that FIG. 8A includes a representation of a portion of the earth surface. This optional addition aids in navigation, although implementation increases the hardware sophistication requirements of the system.

(x) Magnetic North and South

Figure 9:
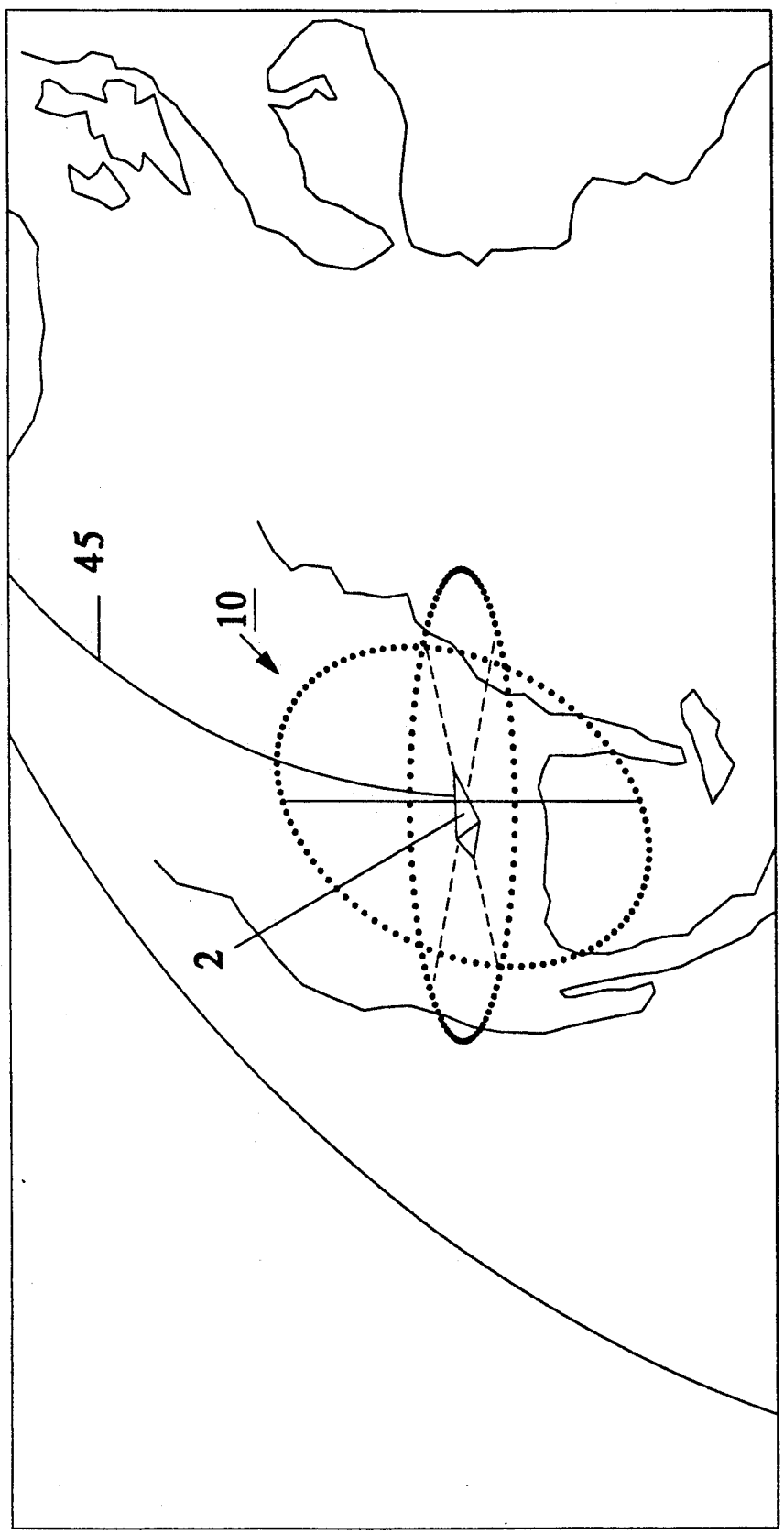
FIG. 9 shows a host craft sphere of influence display as in FIG. 1, further including a magnetic pole indicator and a map of the earth's surface.

Another navigational aid provided by the display of the preferred embodiment is shown in FIG. 9. This feature is a line 45 from the host craft to the earth's magnetic north or south pole. Unlike heading line 40, this optional line is always shown in non-threatening colors. If desired, the host craft's exact position on the globe may be shown by again adding a background map to the display.

(xi) Space Travel

Figure 10:
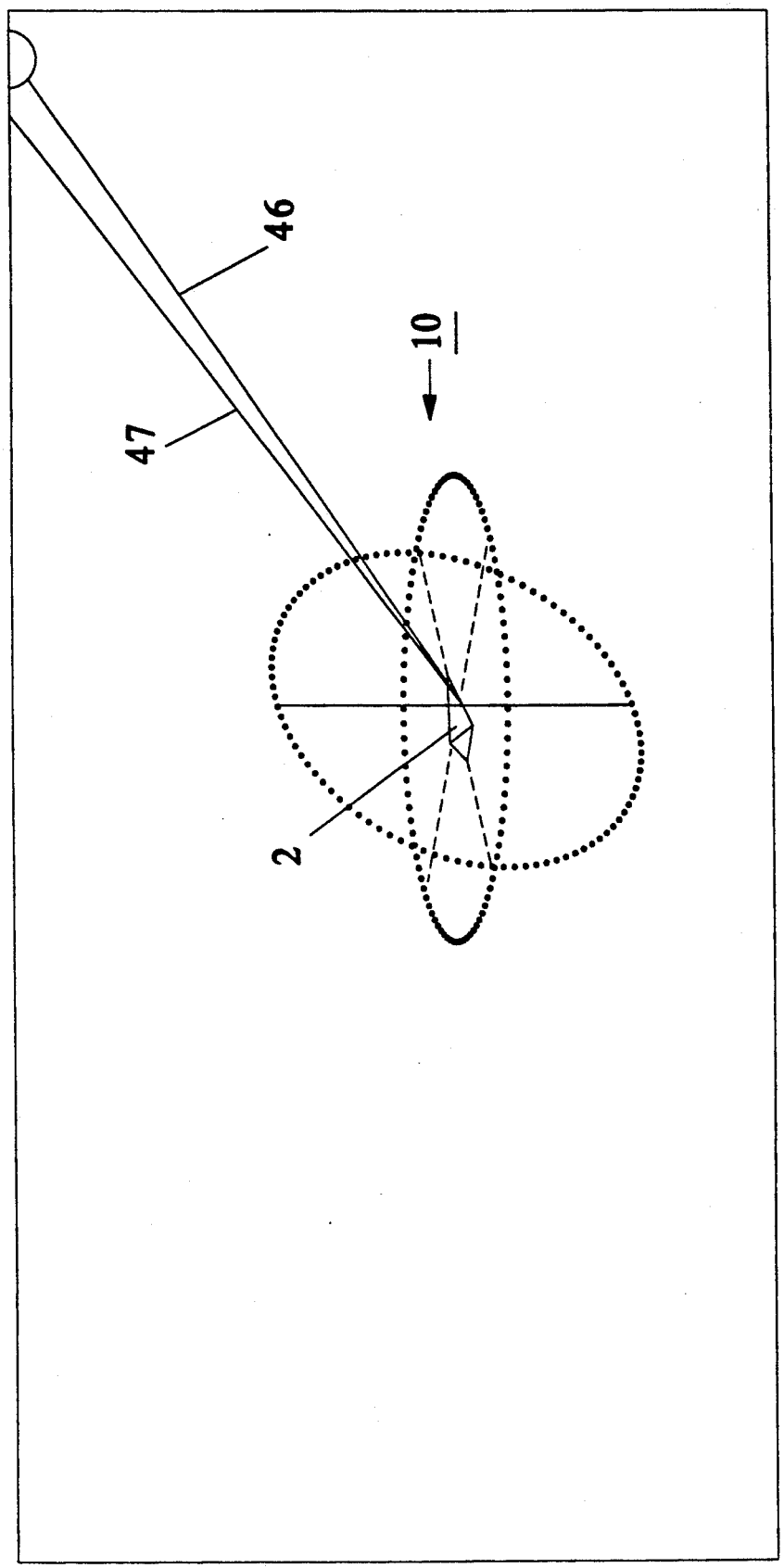
FIG. 10 shows a host craft sphere of influence display as in FIG. 1, further including an indicator of the orientation of the host craft in respect to the moon.

With the advent of space travel in our solar system, and the promise of space travel outside of the solar system, additional "pendulums" or heading lines may be added to assist navigation and collision avoidance in regions away from the earth. For example, a heading line may be provided to indicate a heading towards or away from the moon. As shown in FIG. 10, the host craft is symbolically "hung" from the center of the moon. The position of the moon may be obtained from an outside source or by an internal triangulation and/or inertial guidance system. Appropriate warning colors may be added to indicate imminent collision with the moon or another object.

Figure 11:
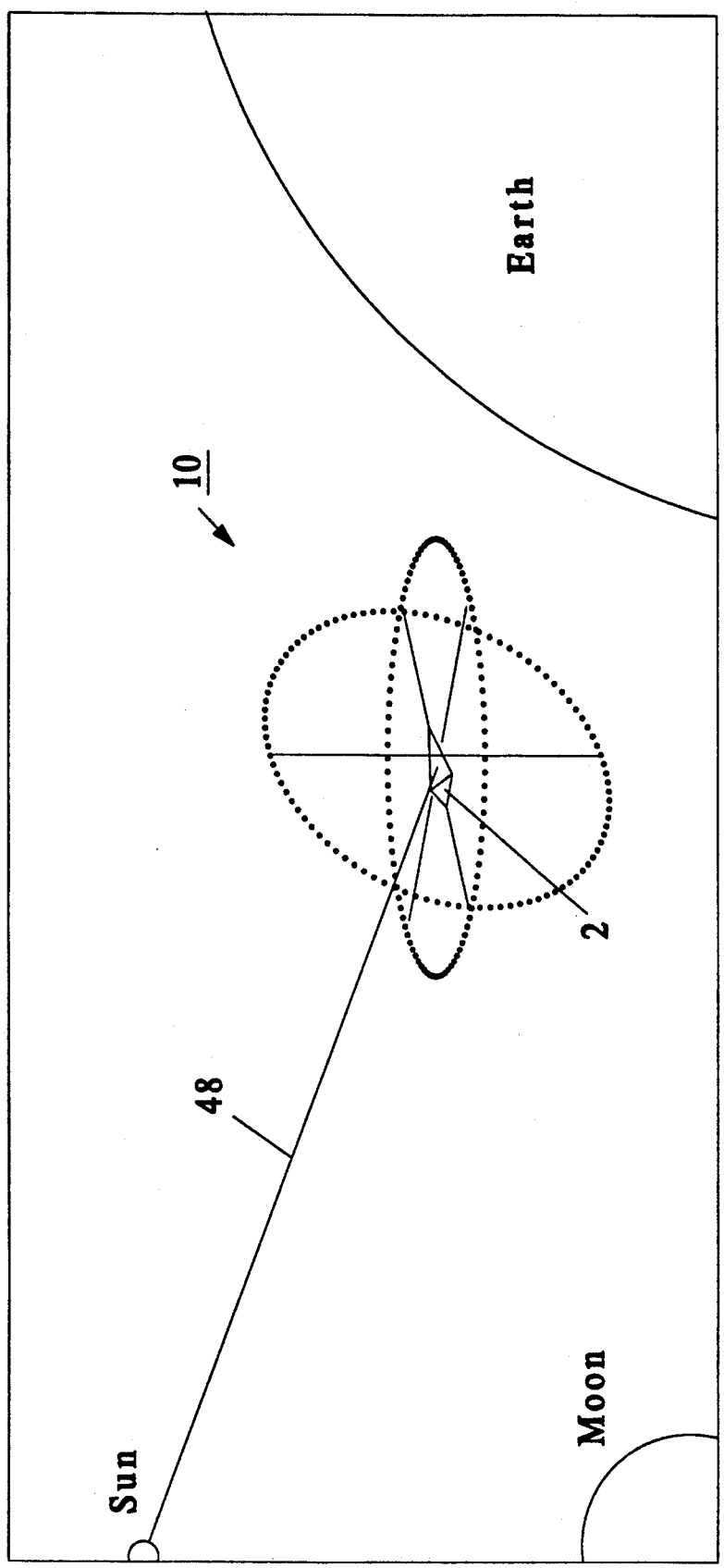
FIG. 11 shows a host craft sphere of influence display as in FIG. 1, further including an indicator of the orientation of the host craft in respect to the sun.

Other heading lines may be added to indicate the orientation and position of the host craft in respect to the sun, as shown in FIG. 11 or to another moon, planet, star or other astronomical body. To further distinguish these heading lines, in a preferred embodiment of the invention, the lunar line is silver and the solar line is yellow. A blue/green line may be used to indicate the earth, and for future applications, other colors may be selected to indicate the different planets and their moons.

(x) Collision Analysis—Post Mortems

Figure 27:
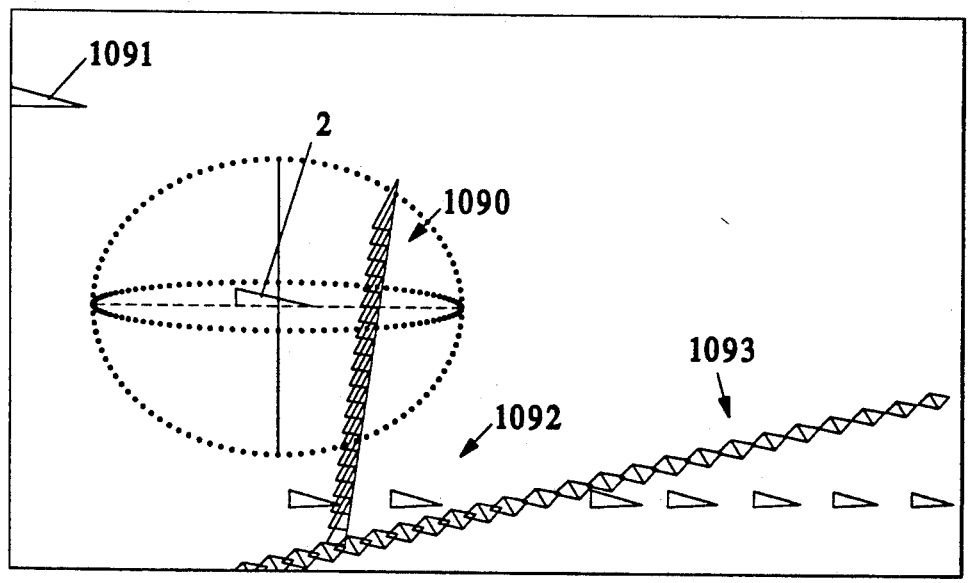
FIG. 27 illustrates the collision analysis capabilities of the preferred display system.

FIG. 27 illustrates two features of the preferred display, each useful for purposes of analyzing airspace incursions or collisions after they have occurred. This "post mortem" capability utilizes the host craft's "black box" flight recorder or a ground base recorder to store and replay images captured by the preferred display system of the relative flight paths of all displayed objects.

As shown in FIG. 27, an entire near collision sequence has been recorded and displayed utilizing the ability of the system to vary the point of view of the user by changing the initial pitch, yaw, and roll biases of the host craft, and consequently of the display coordinate system, to best illustrate the collision sequence. In the display of FIG. 27, the host craft's orientation has been altered so that the user's viewpoint is located off the starboard wing of collision threat 1090, and only a single side of the host craft's windtee 2 is visible.

A further feature shown in FIG. 27 is the ability of the system to retain images of collision threats at selected intervals and display the images simultaneously for a "time lapse" effect. Thus, it can be seen from the display of FIG. 27 that collision threat 1090 executed a steep climb which, from the scale of threat 1090, can be seen to have passed in front of, and within the sphere of influence of, host craft 2. Three other objects 1091-1093 also are shown to have been in the area during the incident, and their paths are also captured in time lapse, object 1092 having moved fastest in relation to the host craft as indicated by the greater distance traversed per interval.

II. Hardware (i) Basic Display System

Figure 12:
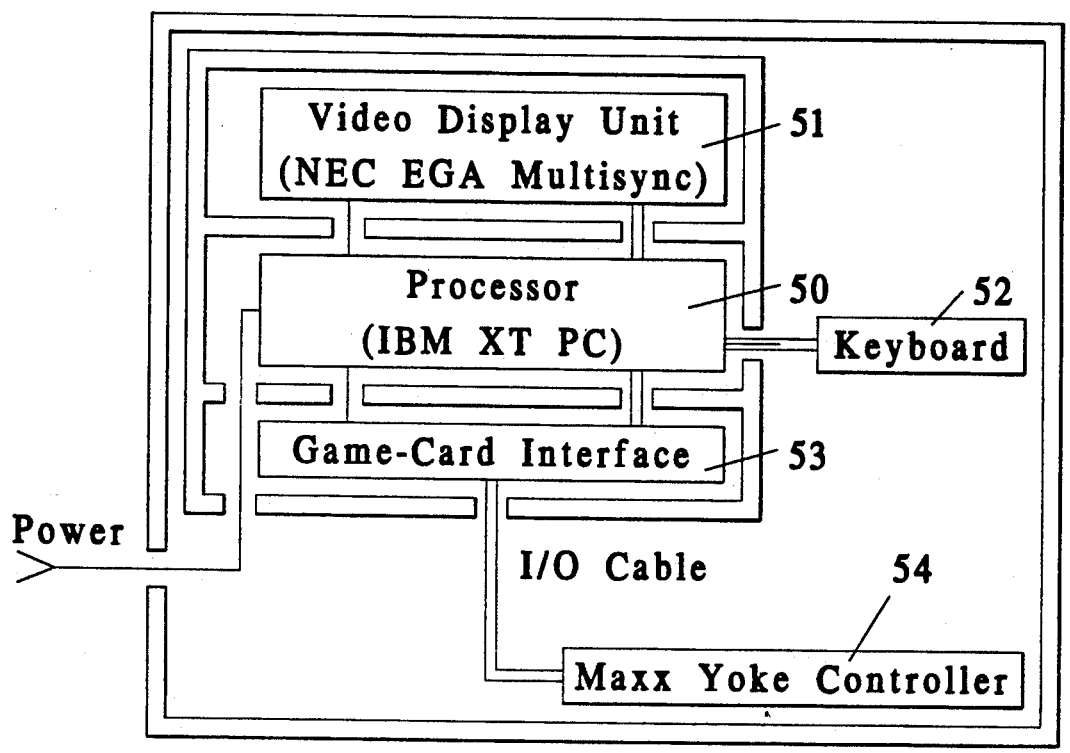
FIG. 12 is a block diagram of a first preferred system hardware embodiment for generating the display of FIGS. 1-11.

FIG. 12 is a block-diagram of the hardware for a display system having the features of the above-described preferred embodiment, including an IBM XT TM personal computer 50 having 640k ram, a 20M byte hard drive, one 5.25 inch 360k floppy disc drive, a display 51 including an EGA video driver card, one game port 52, a standard keyboard 53, and an EGA multisync monitor. The control software, to be described below, was written in Quick Basic version 2.0, although any other programming language designed to run on an XT TM type personal computer may be used.

This embodiment, suitable for simulation, educational, and entertainment purposes, includes a simulator 54 for the yoke controls of an aircraft, manufactured by Maxx Yoke, and is able to demonstrate each of the features described above. With suitable inputs, the hardware shown in FIG. 12 may also be used for an operational, albeit primitive display, in vehicular contexts. Any interface which receives data having a proper format, or converts data into a format which includes position and velocity coordinates, may be used.

(ii) Advanced Display System

Although all of the above-described features of the inventive display may be implemented using an off-the-shelf personal computer system, it may also be desirable to manufacture the display system in the form of a unit built to specification, with software embedded as firmware, or hardwired into the logic. It is intended that all such improvements, insofar as they incorporate the design concepts of the display described above, be included within the scope of the invention.

Figure 13:
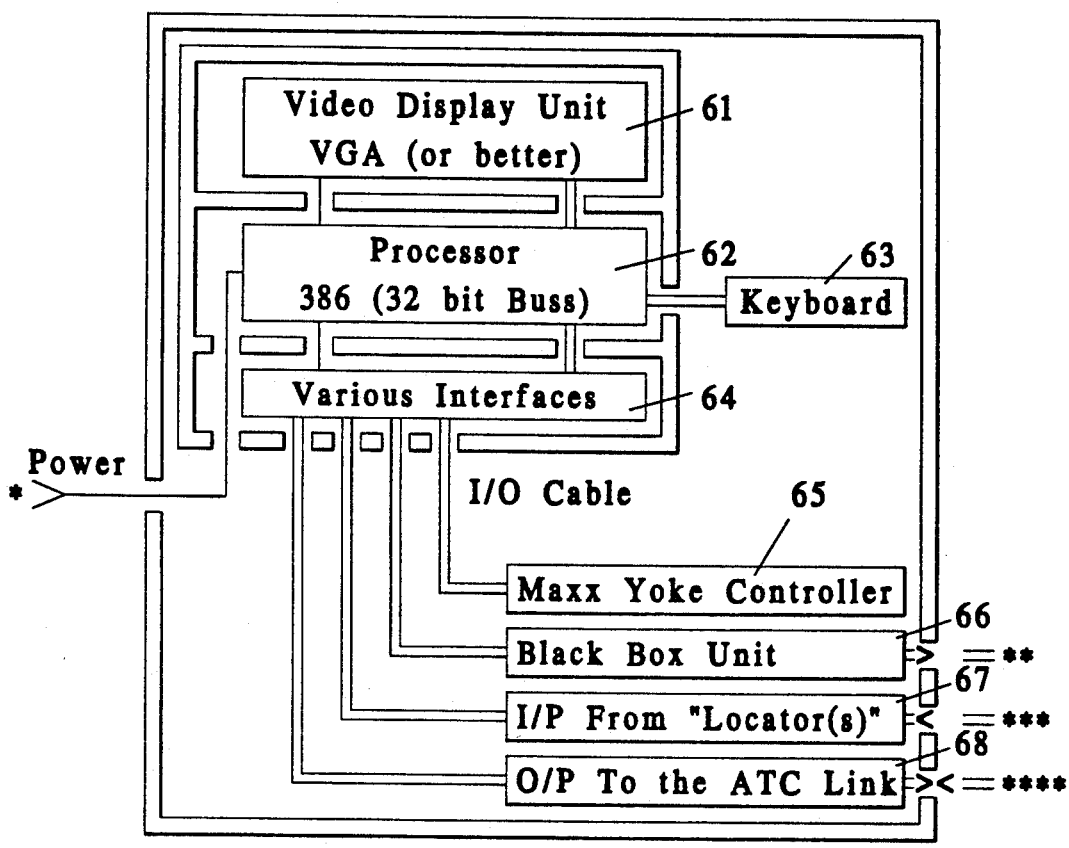
FIG. 13 is a block diagram of a second preferred system hardware embodiment for generating the display of FIGS. 1-11.

FIG. 13 shows a version of the above display system including real time inputs from an external data source. Element 61 is a video display unit, including a graphics adapter having at least the capabilities of a Video Graphics Array (VGA) adapter and monitor. Use of a VGA (or better) adapter permits the sphere of influence to be shown in the form of a diaphanous bubble, i.e., a complete sphere which surrounds the host craft and yet is virtually transparent to permit a view inside the sphere while still clearly indicating the location of the sphere. Display unit 61 is advantageously controlled by a computing unit having at least a 32 bit microprocessor such as an Intel 386 or 486 processor, with appropriate buses, a two Megabyte RAM, and at least a 20 Megabyte read/write storage medium such as a magnetic disk drive. The VGA card also enables implementation of such optional advanced features as threat position triangles that fade with distance and, especially, diaphanous collision threat windtees with shading that enables them to have a solid appearance without being so opaque as to obscure the user's view of other objects that lie behind them in the user's line of sight.

Input 65 is a simulator input such as the Maxx Yoke device and is used for testing and demonstration. The requirements for locator input 67 depend on the type of locator sources, as does the specific requirements for interface cards 64. For example, a number of radar input sources are available for use with the vehicular display system of the invention. When the preferred display system is used in small craft, a radar input may advantageously be provided from an external source, although it is also intended that the display system be useable with on-board radar systems which may be fitted onto existing small craft. Several external source radar front ends are currently available or under development.

A first approach to "miniature" radar front ends suitable for small craft is the cellular approach in which radar signals from each existing air traffic control center are decoded and broadcast from the air traffic control center in question so as to be receivable by any craft equipped with the display system of the invention within a cellular distance. The cellular distance must be application defined. As the host craft passes from one region to another it automatically tunes-in to the new source in the same manner that a cellular telephone tunes in to a new source as it passes from one cell to another.

A second approach is to provide the decoded radar signals from a AWACS or satellite based radar center. Such a center may be equipped to broadcast position and velocity data to any craft equipped with the inventive display system which is within line of sight of the center in question.

The third approach, preferable at present to the first two approaches, is to use existing satellite based navigational systems which operate by triangulating signals originating from aircraft or ships rather than by using an active radar system. Currently, several services provide navigational signals which may be utilized to locate the position of the host craft via an on-board satellite link which may be purchased for a fee. The navigational signals are provided from the Global Positioning System and counterparts such as GeoStar, RailStar, LocStar, and others. However, these systems have the disadvantage that the display system would only know the location of collision threats if those threats were similarly equipped.

A fourth preferred approach is to use the existing TCAS system to drive the display system of the invention in place of the existing, limited display system of the current TCAS systems. However, this approach is suitable only for locating targets equipped with TCAS transponders, and is therefore generally not suitable for use on small aircraft.

In the case of submarines, the input is preferably in the form of sonar, which is also suitable for obtaining data in order to display the lower hemisphere of the "sphere of influence" of marine vessels such as boats, hovercraft, torpedoes and ships. Sonar is currently installed on almost all marine vessels of any significant size.

Of course, any aircraft which is currently equipped with an on-board radar system may also use the display of the invention.

Whatever the input source, the data requirements, including data format and interface wiring, are intended to be compatible with those of conventional radar displays. The greatly improved "user friendliness" of the display system does not require complex input format conversion, but rather may be advantageously adapted for use with any existing radar input or broadcast source providing location and velocity data, and may be implemented by anyone skilled in the art. Furthermore, it is noted that even if velocity data is not provided, velocity may easily be derived from changing location data.

Black box unit 66 is a data recorder of the type currently used in aircraft to record flight data for use in the event of an accident or near collision. The output of the display driver may be directly input into the black box for subsequent replay of the incident as seen from the host craft's perspective. Alternatively, the data recorded by conventional means in a black box may be used as a primary input for conversion into the preferred format. It is noted that the invention as described above also permits ground-based storage of data and playback from the point of view of the "host craft," eliminating the need to search for missing black boxes.

"ATC Link" 68 permits output to the Air Traffic Control system so that the Air Traffic Controller may observe the skies around the host craft, in addition to sending data to the host craft. A similar link may be used in a "Harbor Master" or ground-based space "Mission Control" or space-craft tracking system.

Educational, Entertainment, and Simulation versions of the preferred display system may be provided with a time division multiplexer interface for permitting use of a plurality of yoke controllers via a single standard game interface card similar to card 53 shown in FIG. 12.

III. System Control Logic

Figure 14:
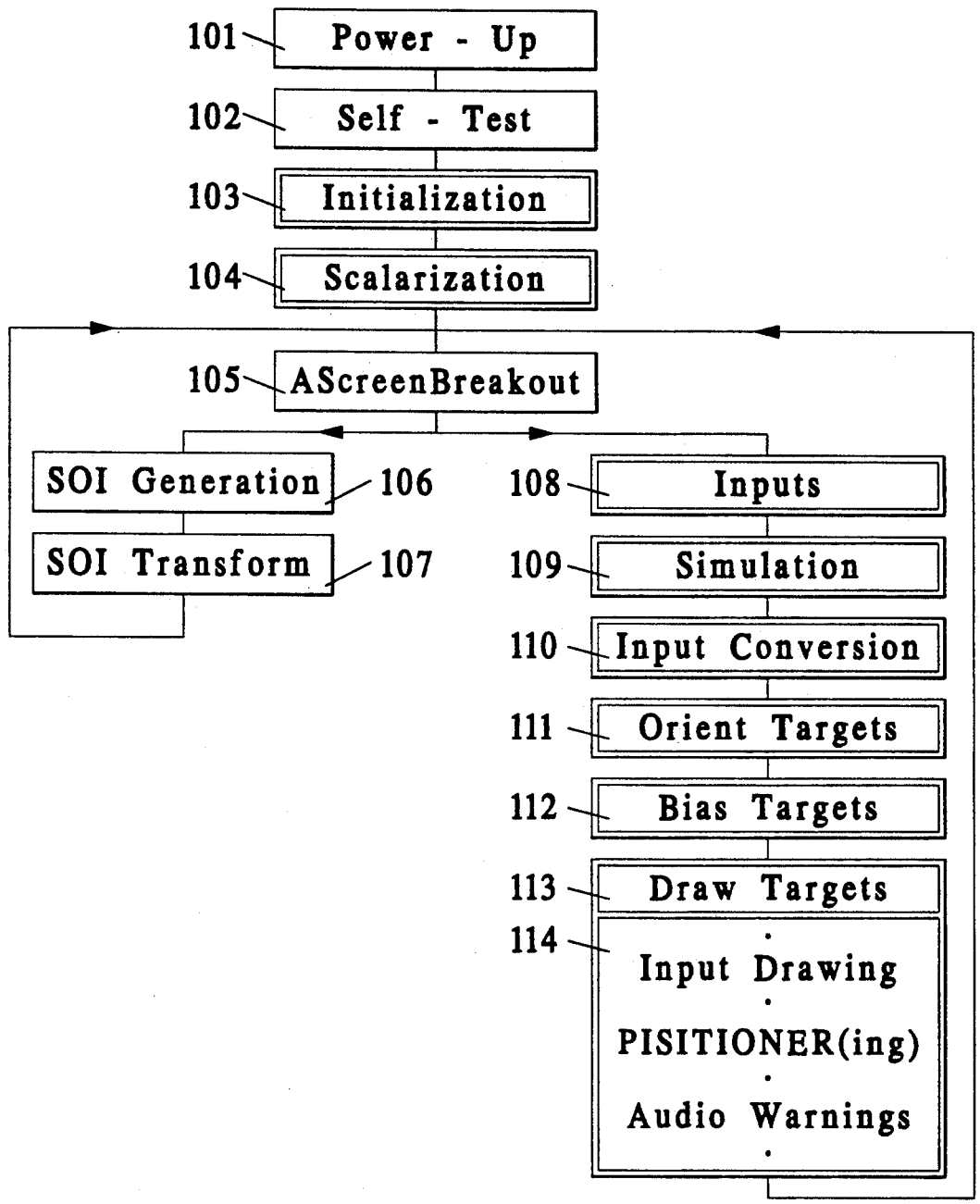
FIG. 14 is an overall flowchart of a preferred method of generating the display of FIGS. 1-11.

Each of the display features described above may be generated using graphics techniques familiar to those skilled in the art, once the basic concepts of the invention are mastered. In general, generation of the respective displays simply requires input of host craft and collision threat coordinates, transformation of those coordinates into a host-craft-centered three-dimensional coordinate system, and drawing of the various object representations and other display features. Numerous commercial software programs are available to assist in display generation and, in addition, many of the graphics or coordinate transformation routines may be carried out by dedicated system hardware. While specific examples of preferred display generation routines suitable for software implementation are described herein, it will be appreciated by those skilled in the art that numerous variations of the described routines are possible, and that the invention should consequently be viewed in terms of overall display concepts as described above, rather than as a specific software or hardware implementation. Keeping the above in mind, a preferred method of implementing the inventive display is as follows:

FIG. 14 shows a system level control flow chart. Step 101 is the power-up function. Using routines common to all vehicular computer applications, the preferred display system is designed for automatic power-up when the vehicle is started. The system loads its own software and prepares to test and run same. In general, automatic power-up need not be included for non-vehicular applications, e.g., educational, entertainment and simulation type applications which are used in a PC environment. The power-up routines are well known and will not be further described here.

After powering-up in vehicular applications, or "loading" in PC oriented applications, the unit runs through a series of self tests (102) during which a scenario encompassing all of the concepts used by the preferred display system will be displayed on the screen. In this way, all pilots will quickly become used to the display and will immediately know if the system has developed a malfunction.

After completion of the self-test, standard initialization routines (103) are run. During this time, registers are set to predetermined values, such as the number of radians that the sphere of influence is to be pitched and yawed. Also the front end radar input system is polled to ascertain the exact geographic location of the host craft, arrays are dimensioned, and application specific tables and data are loaded.

(i) Sphere of Influence Generation

Figure 15A:
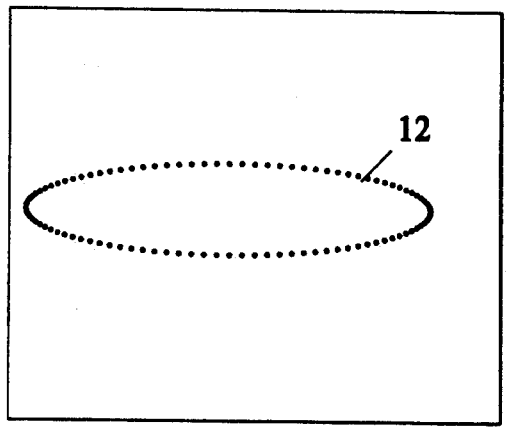
FIGS. 15A-15E illustrate the sequence by which the sphere of influence drawing is generated.
Figure 15D:
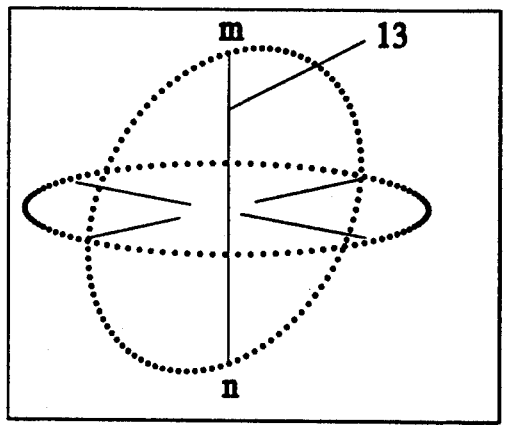
Figure 15B:
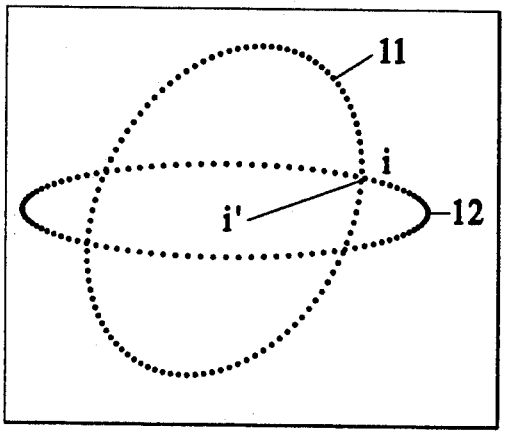
Figure 15E:
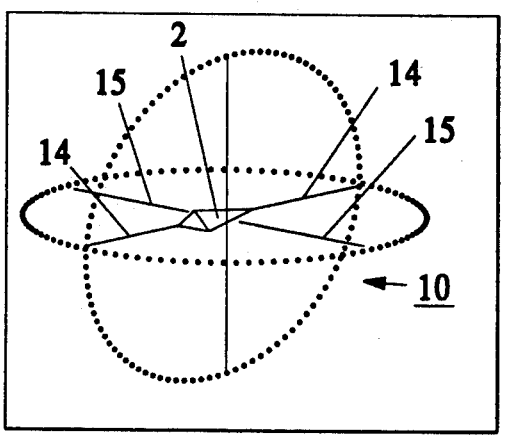
Figure 15C:
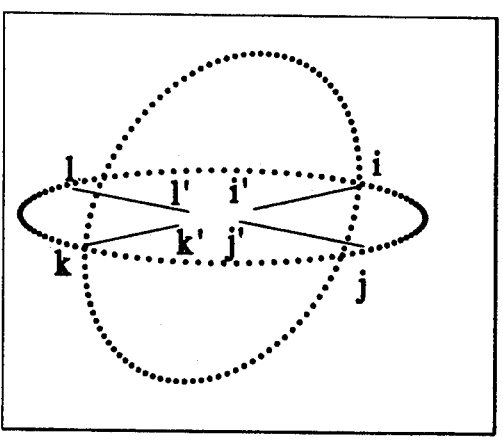

After scalarization (step 104) and determining whether the host craft has been drawn (step 105), the software that generates the parameters and data points for the sphere of influence (SOI) is run (step 106) and the resultant sphere of influence points with associated color and other information are saved in a video RAM. Generation of the sphere of influence may also be hardwired in the form of a ROM chip rather than performed by software. The sphere of influence consists of the following separate "objects" which are generated in three dimensions and then co-located around the same central point on the screen. Each of the following objects is overlaid in serial fashion, one upon the other:

1. A circle representing the equatorial plane, as shown in FIG. 15A;
2. A circle representing a longitudinal plane at 0°, as shown in FIG. 15B;
3. four lines separated on the equatorial plane by 90°, as shown in FIG. 15C;
4. one line drawn between the theoretical north and south poles through the center of the sphere of influence as shown in FIG. 15D; and
5. the host craft centered in the sphere of influence and oriented in the direction of its movement, as shown in FIG. 15E.

The portion of the system flowchart which controls generation of the sphere of influence is presented in greater detail in FIG. 16. The first step 1000 is to obtain the desired values for pitch bias, yaw bias, and sphere of influence radius, stored during step 102, initialization. The two circles shown in FIGS. 15A and 15B require the generation of two planes, and therefore a counter "i" is provided in step 1001 which is initially set to 1 and then incremented during or after generation of the first plane.

A second counter K for the generation of circles in the planes is also initialized during step 1002. In the example shown, for use with an EGA monitor, it is sufficient to draw one point every 2 degrees around the rim of the circle, because the EGA monitor does not display higher resolution. Therefore, K is set to equal $2\pi$ and subsequently decremented by 0.0349066 radians (2°) in step 1007 until the counter reaches 0, determined in step 1008. It will be appreciated that the amount by which K is decremented is decreased for higher resolution images, such as are made possible by the use of a VGA monitor.

Within the resolution of the circle rim or perimeter, the curve of the circle may be ignored and considered to be a chord, and the Z value in three dimensional Cartesian space is at this time set to 0 for each individual calculation, so that the circles are plotted using the well known formulas $X = rg \sin K$ and $Y = rg \cos K$ (step 1003), where the radius of the sphere of influence is designated rg. After each x and y are calculated, a subroutine to be described below is used to rotate the point (x,y) through the pitch and yaw values specified for the application (step 1004), and the coordinates of the point are sent to a display register for display on the screen.

When all of the points on the equatorial circle perimeter have been processed, the planar loop counter i is incremented to 2 (step 1009), and the points on the longitudinal axis perimeter are calculated in an almost identical manner except that, when i=2, the Z and X coordinates are interchanged (step 1004). After both planes have been plotted, i.e., when i>2, as determined in step 1010, the locations of the vector points are calculated, as shown in FIG. 16.

Next, the vector points are calculated, in order to provide approximately "pitched" and "yawed" axes. There are six vector points i—m on the rim of the sphere of influence as shown in FIGS. 15C and 15D. Points i—l are used to draw compass lines at the 3 o'clock, 6 o'clock, 9 o'clock, and 12 o'clock positions on the equatorial plane, while points m and n are used to draw a north-south polar axis through the sphere of influence. In order to accomplish this, counter i is reset to 1 step 1014, and values yr and pr are set according to the table shown in step 1015 and the corresponding value of the i counter, which increments six times for the six vector points (steps 1018 and 1019). The values yr and pr are the spherical (polar) coordinates of the six vector points.

Each point in turn is then converted to x,y,z format (step 1016) and rotated (step 1017). When all six points on the "gyroscope" perimeters have been processed, the program moves on to calculate the inner locations (i'−1')of the four axes within which the host craft is to be drawn. This is shown in FIG. 15C.

In step 1020, the value for rg is reduced to 2.4 to account for the reduced radius of the inner vector points, while i is now set to 11 (step 1021) and subsequently incremented four times (steps 1025 and 1026) to generate the four inner vector points shown in step 1022. Each of the four vectors is then converted to Cartesian coordinates (step 1023) and rotated (step 1024).

Finally, the host craft will be drawn later, in the center of the sphere of influence, by plotting the four points which define the tetrahedron shaped windtee using the collision threat generation software or firmware for a "collision threat 0" centered at the origin.

(ii) Point Rotation Subroutine

Figure 17A:
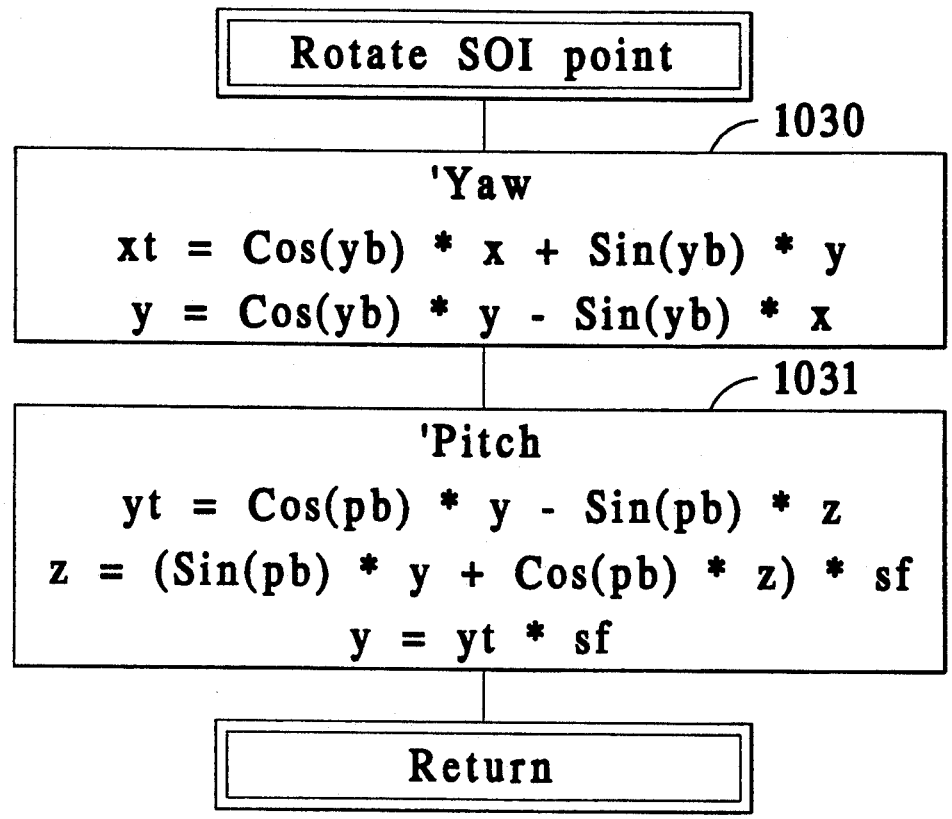
FIG. 17A is a flowchart of a subroutine for rotating sphere of influence points.

The "rotate sphere of influence point" subroutine, called in steps 1005, 1017, and 1024, is shown in FIG. 17A, called in steps 1005, 1017, and 1024. It consists of a standard 3-dimensional rotational algorithm (steps 1030 and 1031), used in a variety of graphics programs, with the "roll" portions removed and a scaling factor added for the screen. In FIG. 17A, yb is the Y Bias, i.e, the desired yaw; pb is the desired pitch or P Bias, and sf is a screen scaling factor based on the size of the display screen.

(iii) Spherical to Cartesian Subroutine

Figure 17B:
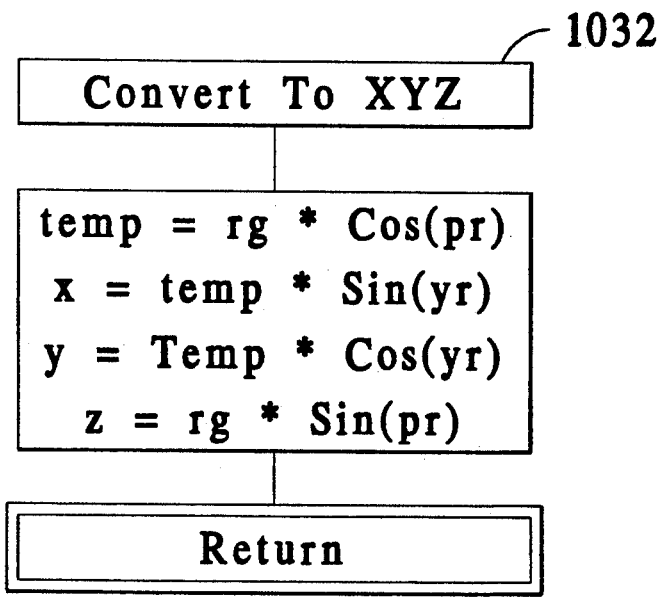
FIG. 17B is a flowchart of a subroutine for converting spherical coordinates to Cartesian coordinates.

FIG. 17B shows the Convert-To-XYZ subroutine. In this subroutine, the spherical (polar) coordinates for each point are converted into X,Y,Z format (step 1032). The algorithm formulas listed are part of a standard mathematical algorithm.

(iv) Collision Threat "Simulation" From Spherical Coordinate and Velocity Information Returning to the main system flowchart shown in FIG. 14, step 108 requires scanning of all interfaces for the existence of collision threat data. When collision threat data is available, the "windtee" subroutine is called in order to draw the collision threats. The same subroutine, with coordinates centered at the origin, is used to draw the host craft windtee.

In general, the inputs will convey the following information: the spherical coordinates yr Dev (i) and pr Dev (i) of the object to be drawn, and its velocity throttle (i). Step 109 refers to a sub-routine in which the three input values are converted from user specified front-ends into the new x,y,z locations for the subject collision threats. This subroutine is best understood in respect to FIGS. 18-20.

Figure 18:
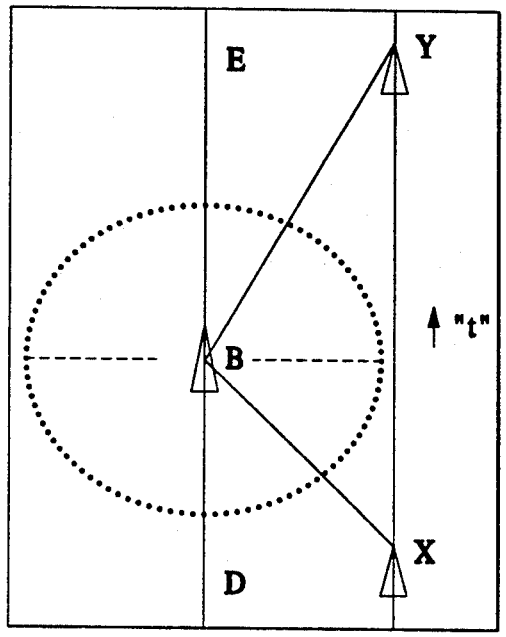
FIG. 18 illustrates the manner in which the orientation and trajectories of the collision threats are calculated for the special case of two dimensions.

FIG. 18 contains a polar view of the sphere of influence and a collision threat at 5 o'clock. For purposes of explanation, a two-dimensional image is initially considered, i.e., the threat is on the same plane as the host craft and does not move from that plane. The general case of three-dimensionality will be addressed later. As shown in FIG. 18, the threat target is moving towards 1 o'clock along the line marked xy. This line represents the real "heading" for the threat target.

A second, imaginary line parallel with the heading x,y that bisects the hub of the sphere of influence is introduced and identified as line DE. This imaginary line enables one to use simple trigonometry to define, predict, and/or simulate all future locations of the threat based upon the three input factors yr Dev (i), pr Dev (i), and velocity input (i) as follows:

First, triangle XBY is generated. Angle EBX represents the yaw angle, as measured from the heading line ED, and line BX represents the distance from the origin for the original position of the threat. Line XY represents the distance that the threat will travel in time t based upon the velocity input.

Initially, it is assumed that the threat target will travel from point X towards point Y along the line XY. Because lines DE and XY are parallel, angle $BXY = \pi - EBX$, which is equivalent to angle DBX. Also, using elementary trigonometry:

$$BY = [(BX^2 + BY^2) - (2 \cdot BX \cdot BY \cdot \cos(BXY))]^{\frac{1}{2}};$$

$$\cos(YBX) = (BX^2 \cdot BY^2 - XY^2)/(2 \cdot BX \cdot BY);$$

$$YBX = -ATN(\cos(YBX)/[\cos(YBX \cdot \cos(YBX) - 1)]^{\frac{1}{2}} + (0.5 \cdot \pi);$$

and $$EBY = EBX - YBX.$$

Angle EBY represents the yaw angle, as measured from the heading ED, for the new position of the collision threat. Line BY represents the new distance for the collision threat from the origin, point B. The new location for the collision threat has now been predicted for the planar example.

Figure 19:
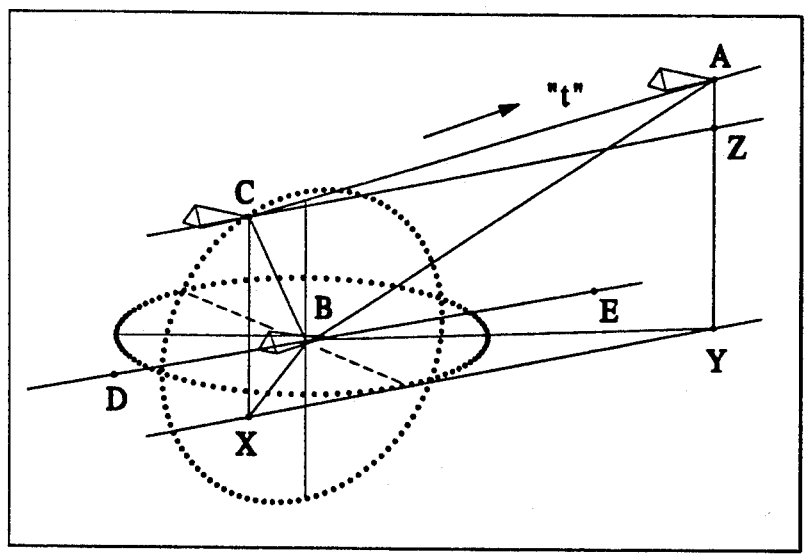
FIG. 19 illustrates the geometry used to describe the orientation and trajectories of collision threats in three dimensions.

The simple planar concept described above must be expanded into a three-dimensional algorithm if it is to be of use in predicting the new location of the collision threat in three-dimensional space. In FIG. 19, the sphere of influence is pitch upwards through the standard 0.7° and yawed to the right by the standard 0.30°, and two more imaginary heading lines, CA and CZ, are introduced for the purpose of forming triangles and vectors as follows:

XY is the original line from the earlier planar two-dimensional diagram. Line XY, however, is now imaginary, and always lies on the plane of the sphere of influence. DE is the original line from the earlier planar two-dimensional diagram and remains imaginary in the plane of the sphere of influence. CZ is a third imaginary line, and represents the course that the collision threat would take if the threat were to never climb or descend from its current altitude at point C, i.e., if no pitch deviation were to occur.

Line CA is the real flight path for the threat target and, in FIG. 19, has been pitched upwards by incrementing angle ACZ by a few degrees. In other words, line CA represents the distance that the threat will travel in time t, derived from the velocity input or simulated throttle setting for the scenario. Since collision BC is the distance from the origin, XBC is the original pitch angle for the collision threat in the plane of the sphere of influence, and EBX is the original yaw angle for the threat target, the new pitch, yaw, and distance from the sphere of influence are derived as follows:

CA becomes the distance to move the threat target, BXY is set equal to $\pi - yro$, where yro = EBX, CBX is set equal to pro, and BC is set equal to ro. Then:

| | |
|---|---|
| CX = Sin (CBX) * BC | (original height above plane) |
| BX = Cos (CBX) * BC | (third leg of triangle CBX) |

-continued

| | |
|---|---|
| ACZ = prDev | (# of radians to pitch heading) |
| AZ = Sin (ACZ) * CA | (altitude increase/decrease) |
| CZ = Cos (ACZ) * AC | (third leg of triangle ACZ) |
| XY = CZ | |
| BY = [(BX$^2$ * XY$^2$) - (2 * BX * XY * Cos (BXY))]$^{\frac{1}{2}}$ | |
| YBX = [-ATN(Cos(YBX)/[(Cos(YBX) Cos(YBX) - 1)]$^{\frac{1}{2}}$] + 0.5*$\pi$ | |
| AY = CX + AZ | (new collision threat height) |
| r = (AY$^2$ + BY$^2$)$^{\frac{1}{2}}$ | (new distance from origin) |
| pr = ArcTan ((AY/BY) | (new pitch above origin) | where yro = the original yaw value in radians (angle EBX), pro = the original pitch value in radians (angle CBX), and ro = the original distance from the origin to the threat target. In order to provide an acceptable display, it is preferred that the mathematical portion of the method be performed in, at least, double precision (16 places) arithmetic, and preferably, in 32 places.

Figure 20:
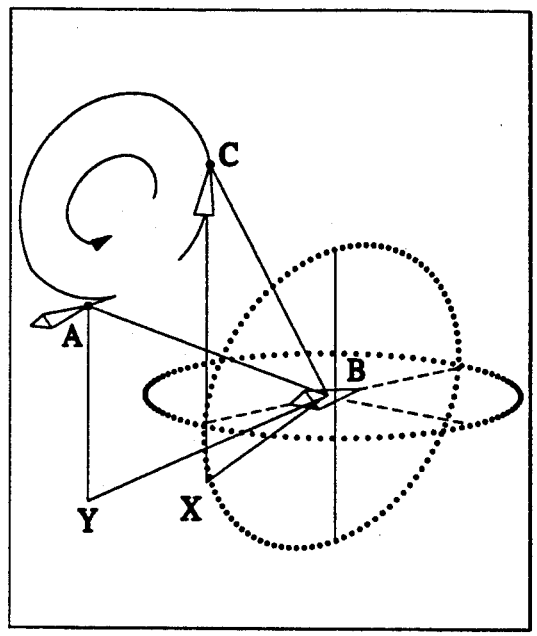
FIG. 20 shows the manner in which a loop is accomplished using the orientation and trajectory calculating techniques illustrated in FIG. 18.

As shown in FIG. 20, in which the imaginary lines have all been removed for clarity, the math works even when the threat target is rolled-over in a loop-the-loop manner. However, it is important that the signs be carefully controlled. Each time the threat target reverses direction in respect to its original course, the signs must be altered.

(v) Other Input Formats

Inputs from a Global Positioning System (GPS) type system are provided using longitudinal, latitudinal, and altitudinal data which needs to be converted by storing the known location of the host craft and all surrounding collision threats and other objects, and then determining the relative locations of the collision threat with respect to the host origin by subtracting the host craft's longitudinal, latitudinal, and altitudinal data from that of each collision threat.

For example, if the GPS data gives a longitude 35°, latitude 40°, and altitude 5000 meters for the host craft, then the system will subtract the (longitude, latitude, altitude) = (30, 45, 5000) vector from the vectors for the threat targets. All necessary data for the above subroutines can then easily be derived from this data.

Inputs from an on-board scanning system will necessarily arrive in terms of degrees or radians and distance from the origin, and does not need to be converted.

(vii) Collision Threat Orientation

Figure 21:
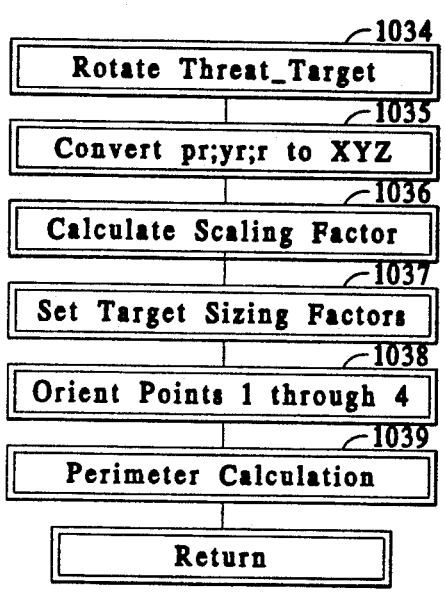
FIG. 21 is a flowchart of a subroutine for rotating a collision threat representation.
Figure 22:
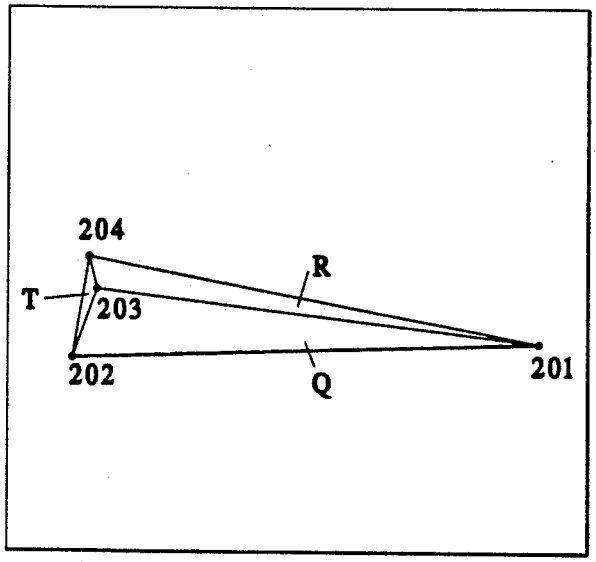
FIG. 22 shows the "windtee" symbol of FIG. 2, rotated about a central axis to show two lateral surfaces.

In order for the pilot of the host craft to understand from the display which direction a threat is traveling in respect to the host craft, the system must reorient the threat to accurately represent this heading information. This reorientation calculation is shown in FIG. 21. The threat consists of four points in three-dimensional space, five or six corresponding lines connecting the four points, depending upon orientation, and four triangular sides defined by the five or six lines. When turning in three-dimensional space, the threat's nose, point 201 as shown in FIG. 22, is considered to be the fulcrum and the other three points 202–204 rotate around it. It is therefore only necessary to calculate the changed locations of three points. Because of the simplicity of the four point system and the need for at most six lines to connect the four points, the calculations can be performed with high speed even on an IBM XT ™ or similar computer.

Figure 23:
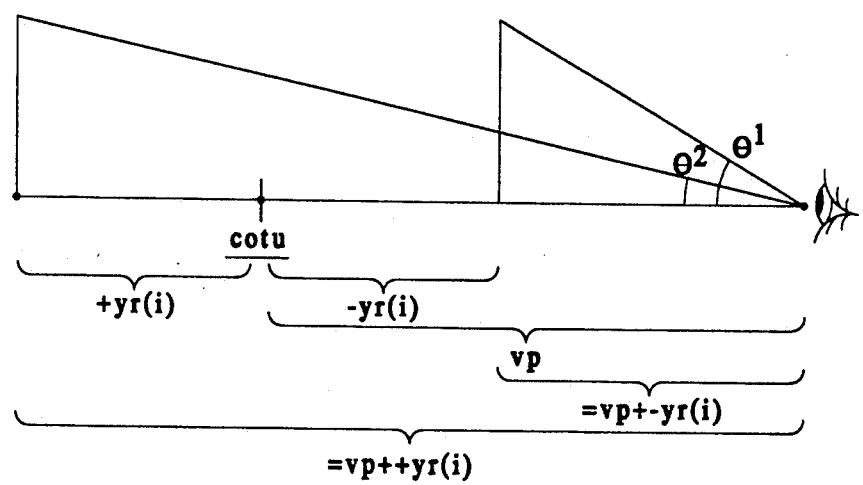
FIG. 23 is a diagram of the geometry used in calculating scaling factors.

The orientation subroutine first places the threat at its proper location in respect to the host craft's coordinate system (step 1034) by calling the rotate subroutine of FIG. 17B, then converts the spherical coordinates for each point (pitch, yaw, and radius) into three dimensional cartesian coordinates by calling (step 1035) the subroutine shown in FIG. 17B. The scaling factor is calculated in step 1036 by using the formula Scale $T = ATN(TW/ABS(vp) + yr(i)))$ where TW is the target width, vp is the "viewpoint," i.e., the user's theoretical location in three-dimensional space and yr(i) is the distance of the ith threat target from the host craft along the Y axis. The scaling factor is used to ensure that a threat target will be drawn, on the screen, at the correct size with respect to its distance from the user's theoretical position in three-dimensional space. Targets that are farther from the user's viewpoint VP are drawn smaller than those that are closer to the user's viewpoint VP. FIG. 23 depicts the geometry behind this calculation.

As illustrated in FIG. 23, the apparent distance between the user and any collision threat or other object is equal to vp±yr(i). The displayed size Scale T of any threat target is set by ascertaining the angle $\theta$ between the hypotenuse of a right triangle formed by the distance VP+yr(i) and the apparent height of the object as viewed from the user's position, which will be greater when an object is nearer point vp (angle $\theta^1$) than when it is further away (angle $\theta^2$).

After the scaling factor Scale T has been determined, the collision threat "target" sizing factors are set (step 1037). The target width TW is set to equal 1*Scale T, the target length (TL) is set to equal 4*TW, and the collision threat base is set equal to zero, which means that each threat target has a nominal height of 1. This nominal height is adjusted based upon the scaling factor as described above, the length of the threat is always set to equal 4*TW, and the base of the threat target has been set to always equal zero.

It is noted that the inventor has found these relationships to be most pleasing to the eye but that prospective users may opt to change these values as desired according to aesthetic preference.

Figure 24:
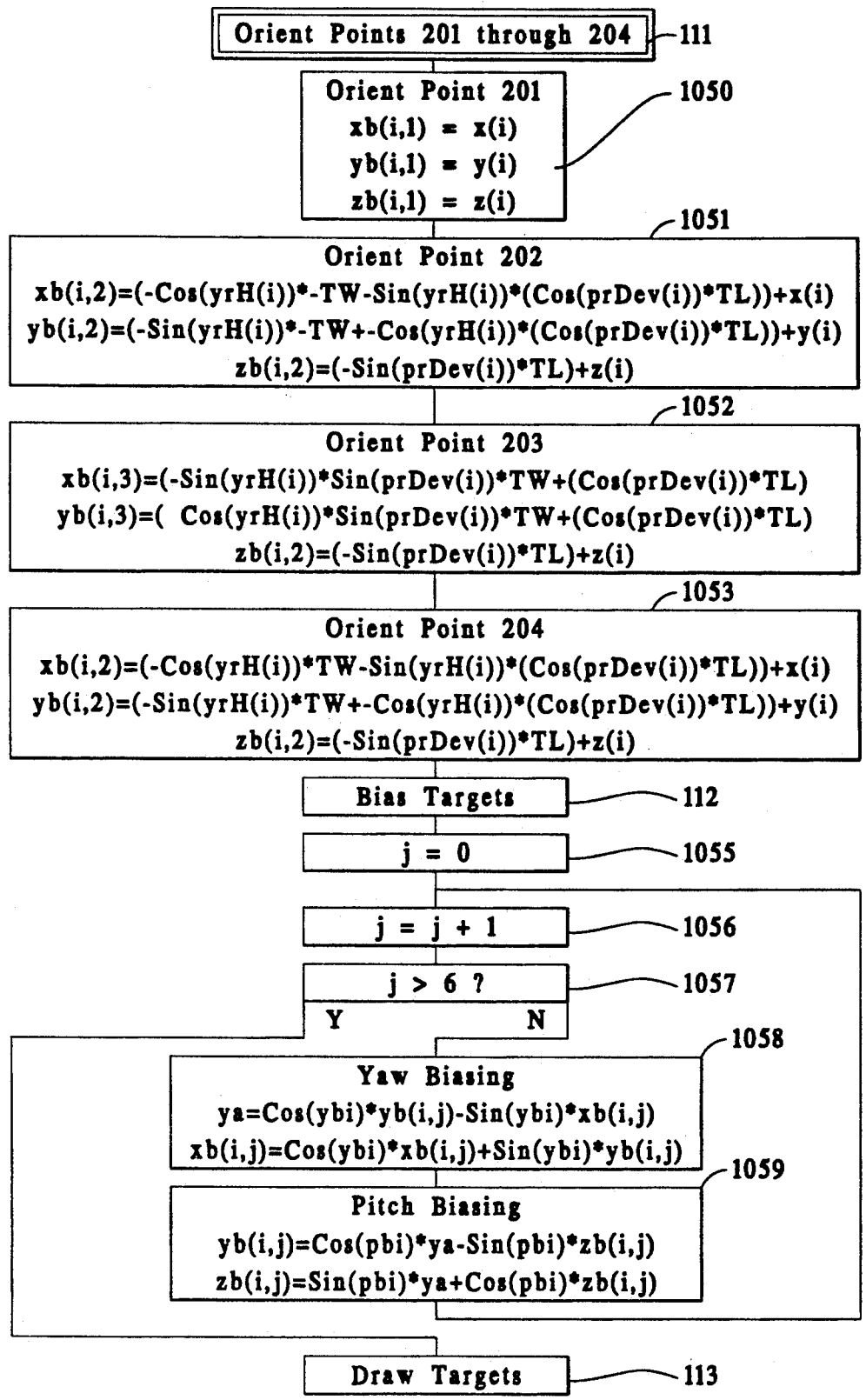
FIG. 24 is a flowchart of a method of orienting and drawing the windtee of FIG. 22.

Once the collision threat has been sized, points 201–204 of the respective threat are "oriented" with a rotation sub-routine (III) based upon the one described earlier in connection with FIG. 17B for rotating the sphere of influence. This routine, shown in FIG. 24, is somewhat more complicated, however, as four points have to be processed. In step 1050, point 201 is oriented. Point 201, the fulcrum around which the other points are rotated, simply needs to be translated in respect to the host craft. Steps 1051–1053 are rotations of respective points 202–204 about point 201, plus the appropriate translations X(i), Y(i), and Z(i), and are derived which are the X, Y and Z values of the ith object obtained from step 109 as described in section (iv) of part III, above from the rotation formula shown in FIG. 17A, using trigonometric relations based on the geometry of the tetrahedron shaped windtee, wherein yr Dev(i) and pr Dev(i) are obtained as described in Section (iv) above in respect to FIGS. 18–20.

The same sub-routine is also used to rotate the triangle indicator as shown in FIGS. 3–5. These indicators are easily drawn using the calculations described above in connection with FIG. 19.

Because the sphere of influence is pitched and yawed by a predetermined number of radians, the threat object points 1–6 described above must now be biased (rotated) once again, by amounts equal to the pitch bias and the yaw biases used. This is accomplished as shown in FIG. 24 by performing 6 iterations using counter "j" (steps 112, 1055, and 1056) and the rotation formula shown in steps 1057 and 1058, where pbi is the number of radians to pitch and ybi is the number of radians to yaw, both of which are user derived.

(viii) Draw Windtees

Figure 25:
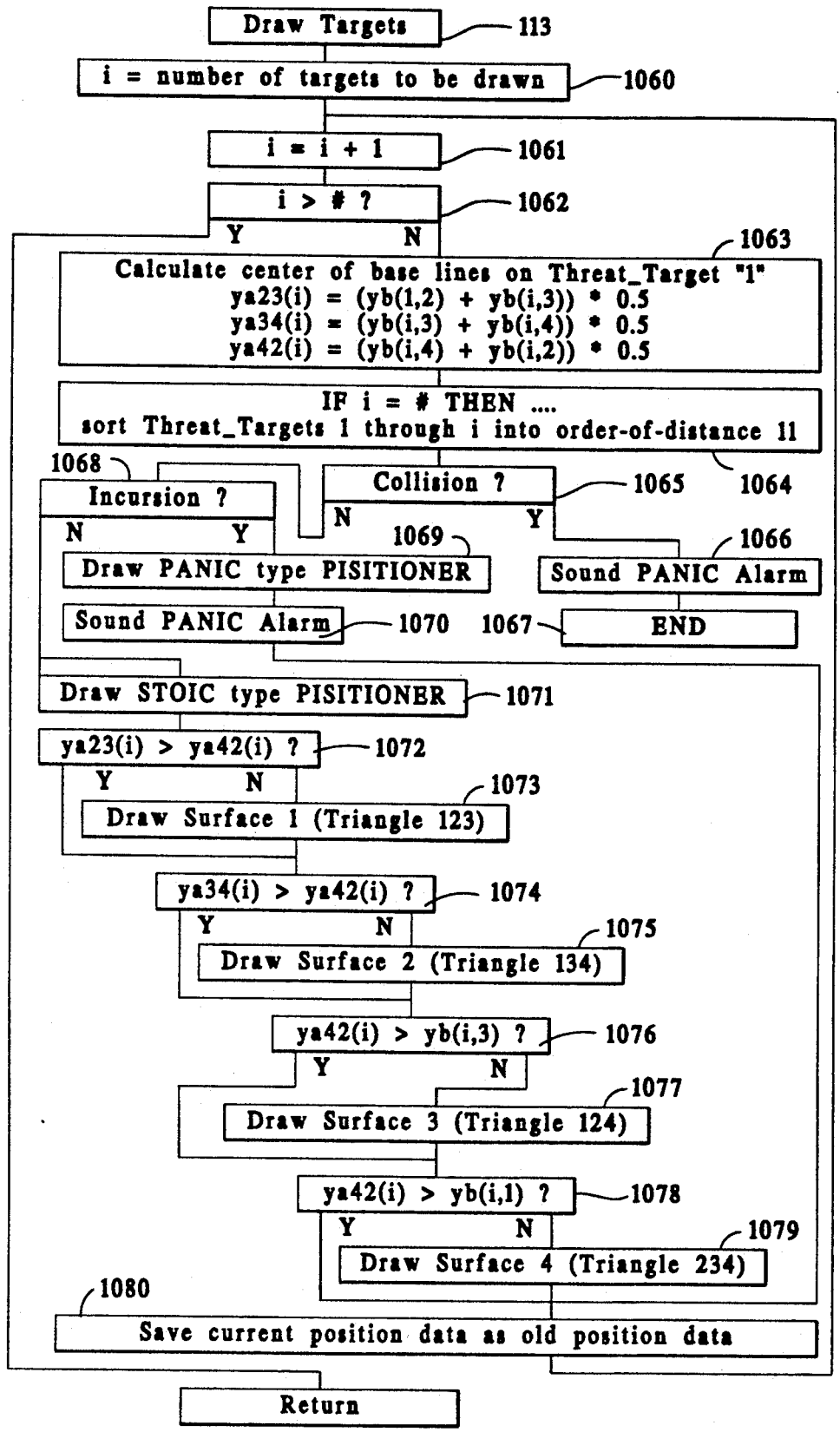
FIG. 25 is a flowchart of a method of indicating collision threat probabilities.

The windtees for the collision threats to be displayed on the display screen may now be drawn (step 113) using the sub-routine shown in FIG. 25, which uses a counter i set equal in step 1061 to the number of targets to be drawn and the previously described yaw bias values as shown in FIG. 24, Steps 1052-1053. The counter keeps track of how many of the threats that were drawn have been processed (steps 1061 and 1062). In simulation routines, the number of threats to be drawn is always known, while in actual use, the number will vary with the quantity of targets that have been detected by the application driven "front end".

The values ya23($i$), ya34($i$), and ya42($i$) obtained in step 1063 by averaging the coordinates of the four points found in steps 1050-1053 are the center points along the three base lines of the relative threats on the y-axis. This information is subsequently used to decide which, if any, of the four collision threat surfaces should be drawn, and which are hidden from view of the other surfaces.

After calculating ya 23($i$), ya 34($i$), and ya 42($i$), corresponding to the centers of the base lines from points 202 to 203, 203 to 204, and 204 to 202 respectively, for each of the "i" threats, the threats are then sorted in the case of a VGA display, into the order of distance from the user's viewpoint vp in order to determine how to shade the threats so as not to obscure threats which are behind the shaded threats in respect to this viewpoint. This option is desirable in the case of a VGA or better graphics display.

Whether or not step 1064 is performed, the system then determines, based on the position of the target, whether a collision is imminent (step 1065), probable (step 1068), or merely possible. If collision is imminent or probable, respective POINT IN SPACE INDICATOR TRIANGLE (PISITIONERs) are drawn and appropriate alarms sounded in respective steps 1066 and 1069-1070, referred to collectively in the more general flowchart of FIG. 14 as step 114.

Once the four points of the windtee tetrahedron have been located and oriented, the system is ready to actually draw the targets, as shown in FIG. 25. The drawing steps are designated 1073, 1075, 1077, and 1079 for drawing the respective surfaces defined by points 201, 202 and 203 (surface Q); 201, 203, and 204 (surface R); 201, 202, and 204 (surface S); and 202, 203, and 204 (surface T).

As is apparent from FIG. 22, one of the surfaces of the windtee (surface S in the example shown in FIG. 22) is hidden. Alternatively, the windtee could be oriented so that one of the lines is hidden. Steps 1072, 1074, 1076, and 1078 serve to delete any triangle which is hidden by determining which of the base line center values ya 23($i$), ya 34($i$), and ya 42($i$) is closest to the user's viewpoint vp.

Finally, in step 1080, the values used to generate the above figures that are required to calculate the next position for these figures are saved as the "old" values before the system returns to repeat the entire loop.

IV. Variations

Having thus described a vehicular display which gives the user a completely natural and intuitive feel for the relationship between the vehicle and all other objects within a predetermined distance from the vehicle, it will be appreciated that the description should not be limited to the particular embodiments disclosed. In particular, those skilled in the art will undoubtedly envision numerous variations in the hardware and system software which drive the display and which nevertheless come within the scope of the invention.

There are, for example, numerous potential applications for the system in the field of aviation other than collision avoidance, black box analysis, and air traffic control as mentioned above. These applications include collision control or docking, training, and aircraft simulation video games and video teaching aids. Of course, the term "aircraft" is intended to include all forms of flying craft, including helicopters, hovercraft, dirigibles and other balloons.

For marine applications, the system could easily be modified to differentiate between submerged collision threats and airborne ones by coloring respective threats using different colors. For submarines, the pendulum could be used to determine ice cover or the bottom of the ocean. Finally, applications of the inventive display system in outer space are virtually limitless.

If used in a teaching context, geographical data bases of the type which would be used to display the earth's surface on the screen could also be used to make geometry come alive for school children flying their "host craft" around the globe. Trigonometry would be a breeze if the student's could generate triangles on an electronic display and vary all of the ratios at will, while spherical geometry, especially difficult for many students to envision, would be greatly simplified.

Finally, the addition of simulated missiles or lasers fired from either the host craft or from the "collision threats" would make an entertaining video game, with the added twist that all action occurs in three dimensions rather than in two dimensions as is conventional in present space-action video games.

Because of the numerous variations which are possible, and which are intended to be included within the scope of the invention, it will be appreciated that the invention should be defined solely by the appended claims.

What is claimed is:

1. A display system comprising the combination of:
    means for obtaining coordinates of a host craft and other objects situated within a predetermined distance from the host craft; and
    means for dynamically displaying said host craft and said other objects on a two-dimensional screen,
    wherein said host craft is displayed as being stationary and all objects on the screen are displayed at positions given by projections onto a principal plane of the screen of their positions in a three-dimensional coordinate system having an origin located at the position of the host craft and three mutually perpendicular coordinate axes, at least two of which appear to a viewer to be located outside the principal plane of the screen and such that all objects within a predetermined distance from the host craft, on all sides of the host craft, are therefore displayed relative to the three axes in a purely graphical manner which conveys to a user of the system the exact position of the other objects relative to the host craft without necessitating inclusion of alphanumeric characters in the display, said display system further comprising means for transforming said coordinates obtained by said host craft coordinate obtaining means into said three-dimensional coordinate system having said origin located at the position of the host craft, and wherein said display means further comprises means for indicating the direction of movement of said host craft and said other objects in relation to said coordinate system, said direction indicating means further comprising means for representing the host craft by four points connected by at most six lines to form a tetrahedron, one vertex of which points in the direction of movement of the host craft, the triangular side opposite said vertex having a smaller area than the other sides of the tetrahedron.

2. A display system as claimed in claim 1, wherein said display means further comprises means for depicting the host craft tetrahedron as being yawed and pitched at nonzero angles in respect to the plane of the display screen.

3. A display system as claimed in claim 2, wherein said nonzero yaw and pitch angles are, respectively, approximately 0.3 and 0.7 radians.

4. A display system as claimed in claim 1, wherein said direction indicating means further comprises means for representing said other objects by four points connected by five lines to form tetrahedrons, one vertex of each pointing in the direction of movement of the objects in said coordinate system and the triangular side opposite each vertex having a smaller area than the other sides of the tetrahedron.

5. A display system comprising the combination of:
means for obtaining coordinates of a host craft and other objects situated within a predetermined distance from the host craft; and
means for dynamically displaying said host craft and said other objects on a two-dimensional screen,
wherein said host craft is displayed as being stationary and all objects on the screen are displayed at positions given by projections onto a principal plane of the screen of their positions in a three-dimensional coordinate system having an origin located at the position of the host craft and three mutually perpendicular coordinate axes, at least two of which appear to a viewer to be located outside the principal plane of the screen and such that all objects within a predetermined distance from the host craft, on all sides of the host craft, are therefore displayed relative to the three axes in a purely graphical manner which conveys to a user of the system the exact position of the other objects relative to the host craft without necessitating inclusion of alphanumeric characters in the display, said display system further comprising means for transforming said coordinates obtained by said host craft coordinate obtaining means into said three-dimensional coordinate system having said origin located at the position of the host craft, and
wherein said display means further comprises means for indicating the direction of movement of said host craft and said other objects in relation to said coordinate system, said direction indicating means further comprising means for representing said other objects by four points connected by five lines to form tetrahedral object representations, one vertex of each of said object representations pointing in a direction of movement of a corresponding one of said objects in said coordinate system and the triangular side opposite each said one vertex having a smaller area than the other sides of the tetrahedral object representations.

6. A display system as claimed in claim 5, wherein said display means further comprises means for scaling sizes of said object representations according to a distance in said coordinate system from the point of view of a user of the system.

7. A display system comprising the combination of:
means for obtaining coordinates of a host craft and other objects situated within a predetermined distance from the host craft; and
means for dynamically displaying said host craft and said other objects on a two-dimensional screen,
wherein said host craft is displayed as being stationary and all objects on the screen are displayed at positions given by projections onto a principal plane of the screen of their positions in a three-dimensional coordinate system having an origin located at the position of the host craft and three mutually perpendicular coordinate axes, at least two of which appear to a viewer to be located outside the principal plane of the screen and such that all objects within a predetermined distance from the host craft, on all sides of the host craft, are therefore displayed relative to the three axes in a purely graphical manner which conveys to a user of the system the exact position of the other objects relative to the host craft without necessitating inclusion of alphanumeric characters in the display, said display system further comprising means for transforming said coordinates obtained by said host craft coordinate obtaining means into said three-dimensional coordinate system having said origin located at the position of the host craft, and
wherein said coordinate system is a three-dimensional Cartesian coordinate system and further comprising means for generating a sphere of influence representation on the display screen, said sphere of influence representation including two circles, the first in the X-Y plane and the second in the Y-Z plane of said Cartesian coordinate system.

8. A display system as claimed in claim 7, further comprising means for generating a diaphanous sphere representation which includes the two circles.

9. A display system comprising the combination of:
means for obtaining coordinates of a host craft and other objects situated within a predetermined distance from the host craft; and
means for dynamically displaying said host craft and said other objects on a two-dimensional screen,
wherein said host craft is displayed as being stationary and all objects on the screen are displayed at positions given by projections onto a principal plane of the screen of their positions in a three-dimensional coordinate system having an origin located at the position of the host craft and three mutually perpendicular coordinate axes, at least two of which appear to a viewer to be located outside the principal plane of the screen and such that all objects within a predetermined distance from the host craft, on all sides of the host craft, are therefore displayed relative to the three axes in a purely graphical manner which conveys to a user of the system the exact position of the other objects relative to the host craft without necessitating inclusion of alphanumeric characters in the display, said display system further comprising means for transforming said coordinates obtained by said host craft coordinate obtaining means into said three-dimensional coordinate system having said origin located at the position of the host craft, and further comprising probability indicating means for indicating a probability of collision between one of the objects and the host craft, wherein said coordinate system is a Cartesian coordinate system and said probability indicating means includes means for generating a triangle, a first leg of said triangle extending from said origin to said one of the objects, and another leg of said triangle forming the projection of said first leg into the X-Y plane of said Cartesian coordinate system.

10. A display system as claimed in claim 9, further comprising means for varying the color of said triangle according to the probability of collision between one of said objects and the host craft.

11. A display system as claimed in claim 9, further comprising means for periodically increasing the brightness of at least one of the legs of said triangle to indicate an imminent collision threat by causing said one of the legs to flash.

12. A display system as claimed in claim 9, further comprising means for generating an audible warning in case of a high collision threat probability.

13. A display system as claimed in claim 14, further comprising a line extending from the origin of said coordinate system in a direction representative of the direction of one of earth's magnetic poles.

14. A display system as claimed in claim 14, further comprising a heading line extending from the origin of said coordinate system towards a body in outer space.

15. A display system as claimed in claim 14, further comprising an IBM XT ™ compatible computer.

16. A display system as claimed in claim 14, further comprising an Enhanced Graphics Adaptor.

17. A display system as claimed in claim 14, further comprising means for inputting data representative of the position and velocity of the host craft and of objects within a predetermined distance from the host craft.

18. A display system as claimed in claim 17, wherein said data inputting means comprises means for obtaining said position and velocity from sources external to the host craft.

19. A display system as claimed in claim 17, wherein said data inputting means comprises means for obtaining said position and velocity data from an on-board host craft locator system.

20. A display system as claimed in claim 19, wherein said locator system is a radar system.

21. A display system as claimed in claim 19, wherein said locator system is a sonar system.

22. A display system as claimed in claim 14, further comprising means for displaying a path of one of said other objects in respect to the host craft by simultaneously displaying representations of said object at positions representing positions of said object at a plurality of different times for a time lapse effect.

23. A display system comprising the combination of:
means for obtaining coordinates of a host craft and other objects situated within a predetermined distance from the host craft; and means for dynamically displaying said host craft and said other objects on a two-dimensional screen, wherein said host craft is displayed as being stationary and all objects on the screen are display at positions given by projections onto a principal plane of the screen of their positions in a three-dimensional coordinate system having an origin located at the position of the host craft and three mutually perpendicular coordinate axes, at least two of which appear to a viewer to be located outside the principal plane of the screen and such that all objects within a predetermined distance from the host craft, on all sides of the host craft, are therefore displayed relative to the three axes in a purely graphical manner which conveys to a user of the system the exact position of the other objects relative to the host craft without necessitating inclusion of alphanumeric characters in the display, said display system further comprising means for transforming said coordinates obtained by said host craft coordinate obtaining means into said three-dimensional coordinate system having said origin located at the position of the host craft, and further comprising means for indicating deviation of the host craft from a desired heading, wherein said deviation from the desired heading indicating means includes means for generating a triangle, a first leg of which extends from said origin in the direction of the desired heading and a second leg extends from the origin in a direction of an actual heading of the host craft.

24. A display system comprising the combination of:
means for obtaining coordinates of a host craft and other objects situated within a predetermined distance from the host craft; and means for dynamically displaying said host craft and said other objects on a two-dimensional screen, wherein said host craft is displayed as being stationary and all objects on the screen are displayed at positions given by projections onto a principal plane of the screen of their positions in a three-dimensional coordinate system having an origin located at the position of the host craft and three mutually perpendicular coordinate axes, at least two of which appear to a viewer to be located outside the principal plane of the screen and such that all objects within a predetermined distance from the host craft, on all sides of the host craft, are therefore displayed relative to the three axes in a purely graphical manner which conveys to a user of the system the exact position of the other objects relative to the host craft without necessitating inclusion of alphanumeric characters in the display, said display system further comprising means for transforming said coordinates obtained by said host craft coordinate obtaining means into said three-dimensional coordinate system having said origin located at the position of the host craft, and further comprising pendulum means for representing the orientation of the host craft in respect to the ground, wherein said pendulum means comprises a triangle, a first leg of which extends from the origin of said coordinate system in a direction perpendicular to the heading of the host craft and a second leg of which extends from the end of said first leg opposite the host craft in a direction which represents a vertical direction perpendicular to the ground.

25. A method of representing a host craft and its surrounding space on a display screen comprising the steps of
(a) inputting a position and velocity for the host craft and at least one other object within a predetermined distance from the host craft;

(b) transforming the position into a three-dimensional coordinate system having an origin at the host craft, said origin being fixed both in respect to the display screen and the host craft, and three mutually perpendicular coordinate axes, at least two of which appear to a viewer to be located outside the principal plane of the screen and such that all objects within a predetermined distance from the host craft, on all sides of the host craft, may be simultaneously displayed relative to the three axes in a purely graphical manner which conveys to a user of the system the exact location of the other object relative to the host craft without necessitating inclusion of alphanumeric characters in the display; and (c) displaying said host craft and said other object by projecting representations of said host craft and said other object in real time into said screen within said coordinate system, wherein step (c) comprises the step of drawing onto said display screen a representation of a sphere of influence defined by two circles for indicating a predetermined distance surrounding said host craft in three dimensions, the first circle representing a projection of an equatorial plane of said sphere of influence and the second circle representing a projection of a longitudinal plane of said sphere of influence onto said display screen.

26. A method as claimed in claim 25, wherein said step of drawing said circles comprises the steps of setting a Z value of said first circle in three-dimensional Cartesian space to zero for the purpose of calculating the location of points around the perimeter of the first circle, said three-dimensional Cartesian space being defined by three mutually perpendicular axes, an X-axis, a Y-axis, and a Z-axis, said Z value being set to zero such that the circle drawn lies completely in the X-Y plane, drawing said first circle, exchanging Z and X coordinates so that the X-coordinate is set to zero and so that the second circle to be drawn will lie in the Y-Z plane, and drawing said second circle.

27. A method as claimed in claim 26, wherein said first circle is defined by the formulae $X = rg \sin K$ and $Y = rg \cos K$, wherein rg is the radius of the sphere of influence and K is the angular distance between points drawn on the perimeter of the circle.

28. A method as claimed in claim 25, further comprising the step of calculating the six locations at which X, Y and Z coordinates through the origin intersect said two circles.

29. A method as claimed in claim 28, wherein said six locations are located by first calculating the spherical coordinates of each point, and subsequently converting the spherical coordinates to X, Y, Z format, rotating the points, and projecting said points onto the display screen.

30. A method as claimed in claim 29, further comprising the step of drawing the host craft at the center of said sphere of influence.

31. A method as claimed in claim 25, further comprising the step of recording said position and velocity for subsequent replay in order to analyze events represented by the recorded information.

32. A method of representing a host craft and its surrounding space on a display screen, comprising the steps of (a) inputting a position for the host craft and at least one other object within a predetermined distance from the host craft;

(b) transforming the position into a three-dimensional coordinate system having an origin at the host craft, said origin fixed in respect to the display screen and the host craft, and three mutually perpendicular coordinate axes, at least two of which appear to a viewer to be located outside the principal plane of the screen and such that all objects within a predetermined distance from the host craft, on all sides of the host craft, may be simultaneously displayed relative to the three axes in a purely graphical manner which conveys to a user of the system the exact position of the other object relative to the host craft without necessitating inclusion of alphanumeric characters in the display; and (c) displaying said host craft and said other object by projecting representations of said host craft and said other object in real time onto said screen within said coordinate system, wherein step (c) further comprises the steps of drawing four points representing four vertices of a wind tee shape and connecting the four points by five lines to represent said host craft.

33. A method as claimed in claim 32, wherein step (c) further comprises the steps of drawing at least one of said objects by drawing four points representing vertices of the windtee shape and connecting the four points by five lines to represent said object.

34. A method of representing a host craft and its surrounding space on a display screen, comprising the steps of (a) inputting a position for the host craft and at least one other object within a predetermined distance from the host craft;

(b) transforming the position into a three-dimensional coordinate system having an origin at the host craft, said origin fixed in respect to the display screen and the host craft, and three mutually perpendicular coordinate axes, at least two of which appear to a viewer to be located outside the principal plane of the screen and such that all objects within a predetermined distance from the host craft, on all sides of the host craft, may be simultaneously displayed relative to the three axes in a purely graphical manner which conveys to a user of the system the exact position of the other object relative to the host craft without necessitating inclusion of alphanumeric characters in the display; and (c) displaying said host craft and said other object by projecting representations of said host craft and said other object in real time onto said screen within said coordinate system, wherein step (c) further comprises the steps of drawing at least one of said objects by drawing four points representing vertices of a wind tee shape and connecting the four points by at most six lines to represent said object.

* * * * *